(12) United States Patent
Nishikawa et al.

(10) Patent No.: US 7,259,874 B2
(45) Date of Patent: Aug. 21, 2007

(54) INFORMATION PROCESSING APPARATUS, PRINT DATA FORMING METHOD, PRINT CONTROL PROGRAM, AND MEMORY MEDIUM

(75) Inventors: Satoshi Nishikawa, Kanagawa (JP); Koji Nakagiri, Kanagawa (JP); Yasuo Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/290,577

(22) Filed: Dec. 1, 2005

(65) Prior Publication Data

US 2006/0082803 A1    Apr. 20, 2006

Related U.S. Application Data

(62) Division of application No. 09/949,875, filed on Sep. 12, 2001, now Pat. No. 7,092,111.

(30) Foreign Application Priority Data

| Sep. 12, 2000 | (JP) | ............................. 2000-276481 |
| Aug. 27, 2001 | (JP) | ............................. 2001-256021 |

(51) Int. Cl.
*G06F 15/00* (2006.01)
*G06K 1/00* (2006.01)

(52) U.S. Cl. ..................... 358/1.1; 358/1.15; 358/1.12; 358/1.11; 358/296; 400/76

(58) Field of Classification Search ............... 358/1.11, 358/1.12, 1.15, 1.8, 1.1; 274/291; 399/309, 399/364

See application file for complete search history.

(56) References Cited

U.S. PATENT DOCUMENTS

| 5,889,594 | A  | * | 3/1999  | Maekawa ..................... 358/296 |
| 6,278,524 | B1 | * | 8/2001  | Kujirai et al. .............. 358/1.11 |
| 6,462,830 | B1 | * | 10/2002 | Negishi ...................... 358/1.12 |
| 6,688,786 | B2 | * | 2/2004  | Brown et al. ................. 400/76 |

* cited by examiner

*Primary Examiner*—King Y. Poon
*Assistant Examiner*—Satwant Singh
(74) *Attorney, Agent, or Firm*—Fitzpatrick, Cella, Harper & Scinto

(57) ABSTRACT

An information processing apparatus for forming print data to be print-processed by a printer is constructed by: designation receiving means for receiving designation of a duplex printing, discriminating means for discriminating the number of pages in the case where data to be printed has been arranged on a recording paper, and command adding means for receiving the designation of the duplex printing by the designation receiving means and, in the case where it is determined by the discriminating means that the number of pages of the recording paper on which the data to be printed has been arranged is equal to an odd number, adding a command to urge a forced paper ejection in the printer lest a blank page of the last page is logically counted in the printer. A print data forming method and a print control program for realizing such an apparatus and a memory medium which stores such a program are provided. When the last page is printed as a blank page in the printer in a duplex printing mode, the print data is formed lest the last blank page is counted up by a counter.

12 Claims, 19 Drawing Sheets

FIG. 10

| | |
|---|---|
| JOB ID | 1001 |
| JOB SETTING | 1002 |
| NO. OF PHYSICAL PAGES | 1003 |
| PHYSICAL PAGE INFO (1ST PAGE) | 1004 |
| PHYSICAL PAGE INFO (2ND PAGE) | 1005 |
| ... | 1006 |
| PHYSICAL PAGE INFO (LAST PAGE) | 1007 |

FIG. 11

| | |
|---|---|
| NO. OF ENTIRE PHYSICAL PAGES | 1101 |
| NO. OF ENTIRE LOGICAL PAGES | 1102 |
| NO. OF COPIES | 1103 |
| COPY BY COPY | 1104 |
| FINISHING | 1105 |
| ATTACHMENT | 1106 |

FIG. 12

| | |
|---|---|
| PHYSICAL PAGE NO. | 1201 |
| PAGE SETTING | 1202 |
| NO. OF LOGICAL PAGES ON PHYSICAL PAGE (N) | 1203 |
| LOGICAL PAGE INFO (1ST PAGE) | 1204 |
| LOGICAL PAGE INFO (2ND PAGE) | 1205 |
| ... | 1206 |
| LOGICAL PAGE INFO (NTH PAGE) | 1207 |

FIG. 13

| | |
|---|---|
| LAYOUT OF LOGICAL PAGES ON PHYSICAL PAGE | 1301 |
| OBVERSE/REVERSE | 1302 |
| COLOR/MONO | 1303 |
| ATTACHMENT | 1304 |

FIG. 14

| | |
|---|---|
| LOGICAL PAGE ID | 1401 |
| LOGICAL PAGE NO. | 1402 |
| FORMAT | 1403 |

1ST SHEET — OBVERSE (3) REVERSE (a)
2ND SHEET — OBVERSE (1) REVERSE (2)

poDC->Escape (nEsc, 0, NULL, 0, NULL)

poDC->Escape (QUERYESCSUPPORT, sizeof (int), (const char*) & nEsc, 0, NULL)

INFORMATION PROCESSING APPARATUS, PRINT DATA FORMING METHOD, PRINT CONTROL PROGRAM, AND MEMORY MEDIUM

CROSS-REFERENCE TO RELATED APPLICATIONS

This application is a divisional application of application Ser. No. 09/049,875, filed Sep. 12, 2001 now U.S. Pat. No. 7,092,111, which is incorporated herein by reference.

BACKGROUND OF THE INVENTION

1. Field of the Invention

The invention relates to an information processing apparatus, a print data forming method, a print control program, and a memory medium in which such a program has been stored. More particularly, the invention relates to an information processing apparatus for forming print data of a host computer or the like, a method of forming print data, a print control program, and a memory medium in which such a program has been stored.

2. Related Background Art

In an information processing apparatus such as a host computer or the like in which a printer driver program for forming print data to be printed by a printer has been set up, draw data (print command) requested from an application through an OS is converted by using a printer driver into a page description language (hereinafter, also referred to as a PDL) which can be interpreted by the printer.

According to the recent printer driver, by processing a function in the printer on the printer driver side, even a printer having a low function can provide a function similar to the advanced function of the printer to the user. For example, in case of a printer for ejecting a paper in a face-up state, hitherto, print data which is received from the information processing apparatus in an ascending order is spooled by an amount of all pages and a printing process is started from the last page. However, in the recent printer driver, with respect to the printer for performing the face-up paper ejection, the spooling process is executed on the host side before the print data is formed, the print data is transmitted to the printer in a descending order, and it is sufficient that the printer starts the printing process in the receiving order. Therefore, there is no need to provide spooling means for the printer side and the reduction of the costs can be expected. In the case where such a printing in the descending order is executed by the driver and a duplex printing is further performed by the printer, the number of entire pages of a print job (the number of pages when data whose printing is desired is arranged on an actual recording paper: hereinafter, referred to as the number of physical pages or physical page number) is discriminated, and in case of the print job in which the number of physical pages is equal to an odd number, the last page is printed as a blank page on which nothing is printed. Therefore, upon forming of the print job, the driver inserts the print data whose output result indicates a blank page to the last page and inserts a command for instructing that a blank page saving is not performed into the print data, thereby keeping a style in the actual duplex print mode.

In the future, in the printer having such a technical background, there is considered a case of performing a charging process on the basis of the number of print copies which is counted up by a counter for counting the number of printed sheets (specifically speaking, the number of (scanned) faces on which images have been formed by an image forming unit is counted). In the printer for performing the duplex printing as mentioned above, however, if the number of physical pages which are printed is equal to the odd number, for example, if the physical page number indicates 3 pages, a blank page is printed to the last page (the fourth page) corresponding to the reverse side of the third page. However, even in case of the blank page on which nothing is printed, as described above, since the print data of the blank page (this point is also similarly applied to a case of a new line or a new page) has actually been inserted, an image forming is also performed to the blank page (the blank page is also scanned). Therefore, the count-up operation is performed by regarding it as the number of print surfaces, so that the charging process is executed. There is a problem such that inconvenience is caused to the user. Even if the count value is not used for the charging process, in the case where the user made a maintenance contract such that a maintenance fee is different in accordance with the count value, there is a problem such that a similar inconvenience is caused.

SUMMARY OF THE INVENTION

The invention is made in consideration of the above problems and it is an object of the invention to provide an information processing apparatus, a print data forming method, and a memory medium in which a computer-readable program has been stored, in which in case of allowing a printing process in which a last page is set to a blank page to be controlled in a printer for performing a duplex printing, print data such that a count-up by a counter for counting the number of times of an image forming process in the printer is not performed is formed.

To accomplish the above object, according to the invention, there is provided an information processing apparatus for forming print data to be print-processed by a printer, comprising: designation receiving means for receiving designation of a duplex printing; discriminating means for discriminating the number of pages in the case where data to be printed has been arranged on a recording paper; and command adding means for receiving the designation of the duplex printing by the designation receiving means and, in the case where it is determined by the discriminating means that the number of pages of the recording paper on which the data to be printed has been arranged is equal to an odd number, adding a command to urge a forced paper ejection in the printer lest a blank page of a last page is logically counted in the printer.

BRIEF DESCRIPTION OF THE DRAWINGS

FIG. 10 shows an example of a job setting file which is generated by a spool file manager;

FIG. 11 shows an example of job setting information shown in a field 1002 of the job setting file;

FIG. 12 shows an example of physical page information shown in a field 1004 of the job setting file;

FIG. 13 shows an example of physical page setting information shown in a field 1202 of physical page information;

FIG. 14 is a diagram showing an example of a data format which is supplied from the spool file manager 304 to the despooler 305 when a print request of a physical page is issued;

DETAILED DESCRIPTION OF THE PREFERRED EMBODIMENTS

Embodiments suitable for applying the invention will be described hereinbelow.

Figure 1:
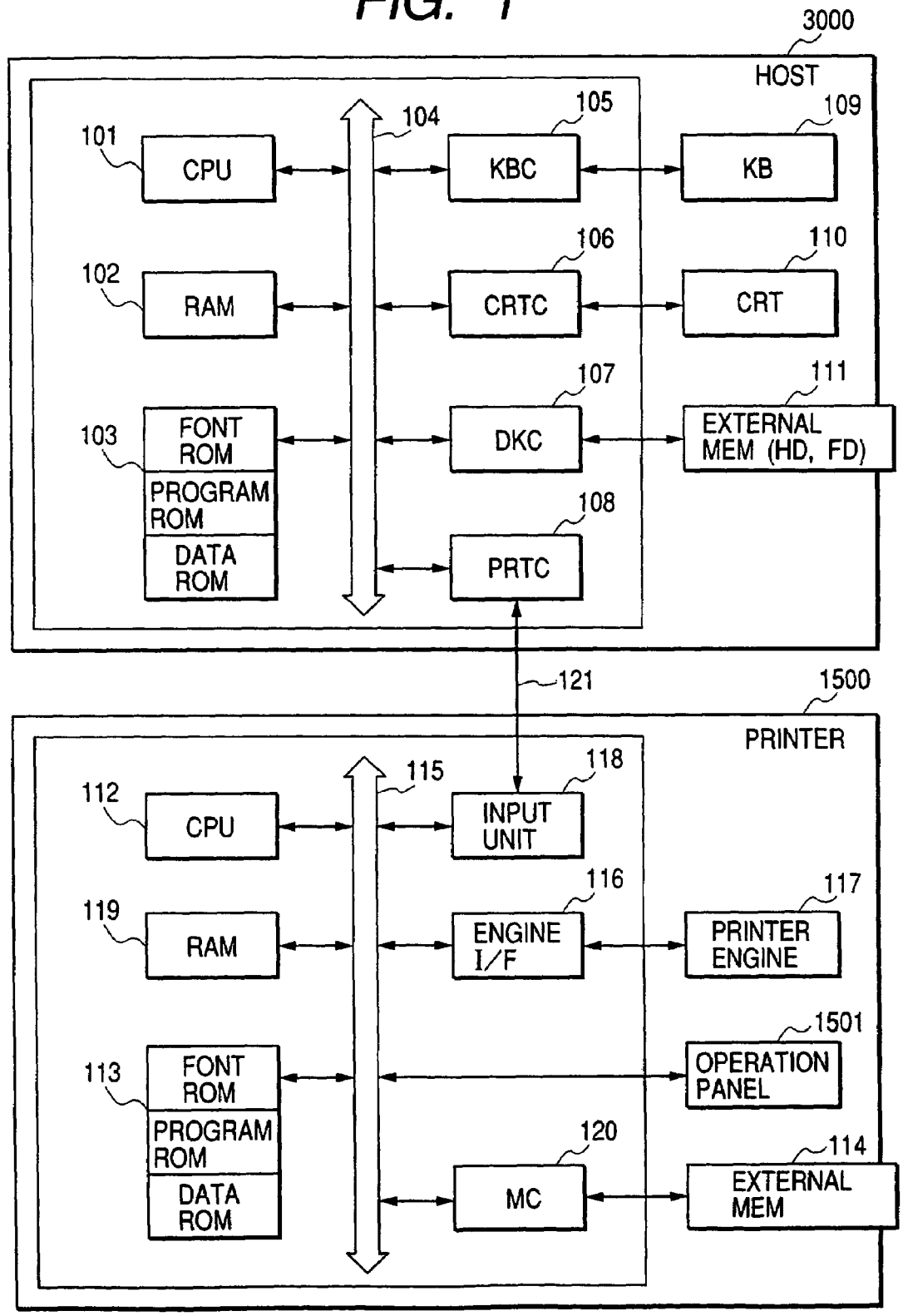
FIG. 1 is a block diagram for explaining a construction of a printer control system showing an embodiment of the invention.

FIG. 1 is a block diagram for explaining a construction of a printer control system showing the embodiment of the invention. The invention can be applied to any of a single apparatus, a system comprising a plurality of apparatuses, and a system which is connected through a network such as LAN, WAN, or the like and executes processes so long as functions of the invention are executed.

In the diagram, reference numeral 3000 denotes a host computer (hereinafter, also simply referred to as a host) which is suitable for the information processing apparatus of the invention and has a function for inserting a command for allowing a printer to execute a forced paper ejection as necessary as will be explained hereinlater. The host 3000 has a CPU 101 for executing a process of a document in which figures, images, characters, tables (including a spreadsheet and the like), and the like exist mixedly on the basis of a document processing program or the like stored in a program ROM of an ROM 103 or in an external memory 111. The CPU 101 integratedly controls each device connected to a system bus 104.

An operating system program (hereinafter, abbreviated to "OS") or the like as a control program of the CPU 101 is stored into the program ROM of the ROM 103 or into the external memory 111. Font data and the like which are used in the document process are stored into a font ROM of the ROM 103 or into the external memory 111. Various data which is used when the document process is executed is stored into a data ROM of the ROM 103 or into the external memory 111. An RAM 102 functions as a main memory, a work area, or the like of the CPU 101.

A keyboard controller (KBC) 105 controls a key input from a keyboard (KB) 109 or from a pointing device (not shown). A CRT controller (CRTC) 106 controls a display of a CRT display (CRT) 110.

Reference numeral 107 denotes a disk controller (DKC) for controlling an access to the external memory 111 such as hard disk (HD), floppy disk (FD), or the like for storing a boot program, various applications, font data, a user file, an edit file, a printer control command forming program (hereinafter, referred to as a printer driver), and the like. A printer controller (PRTC) 108 is connected to a printer 1500 through a bidirectional interface (interface or I/F) 121 and executes a communication control process with the printer 1500.

The CPU 101 executes, for example, a developing (rasterizing) process of an outline font into a display information RAM set on the RAM 102, thereby enabling WYSIWYG on the CRT 110 to be realized. The CPU 101 opens various registered windows on the basis of commands instructed by a mouse cursor or the like (not shown) on the CRT 110 and executes various data processes. When executing the printing, by opening a window regarding the setting of the printing, the user can set a print processing method for the printer driver including the setting of the printer and the selection of a print mode.

Reference numeral 1500 denotes the printer for executing a print outputting process of the print data formed by the host 3000 as an information processing apparatus and has a function for performing a forced paper ejection or a duplex printing in response to a command from the host. The printer 1500 is controlled by a CPU 112. The printer CPU 112 outputs an image signal as output information to a print unit (printer engine) 117 connected to a system bus 115 on the basis of a control program or the like stored in a program ROM of an ROM 113 or a control program or the like stored in an external memory 114. A control program and the like of the CPU 112 are also stored in the program ROM of the ROM 113. Font data and the like which are used when the output information is formed are stored in a font ROM of the ROM 113. In case of a printer without the external memory 114 such as a hard disk or the like, information and the like which are used on the host computer have been stored in a data ROM of the ROM 113.

The CPU 112 can perform a communicating process with the host computer through an input unit 118 and can notify the host 3000 of the information or the like in the printer. An RAM 119 is an RAM which functions as a main memory, a work area, or the like of the CPU 112 and is constructed so that its memory capacity can be expanded by an option RAM which is connected to an expansion port (not shown).

The RAM 119 is used as an output information rasterizing area, an environmental data memory area, or the like. An access to the external memory 114 such as hard disk (HD), IC card, or the like mentioned above is controlled by a memory controller (MC) 120. The external memory 114 is connected as an option and stores front data, an emulation program, form data, and the like. An operation panel 1501 comprises switches for operation, an LED display, and the like.

The external memory 114 is not limited to one memory but can be also constructed in a manner such that a plurality of memories are provided and, besides built-in fonts, option cards and a plurality of external memories in which programs for interpreting printer control languages of different language systems have been stored can be connected. Further, it is also possible to have an NVRAM (not shown) and store printer mode setting information from the operation panel 1501.

The printer 1500 of the embodiment has a counter which counts up the number of printed sheets in accordance with a process such that images are formed by the printer engine 117, that is, a laser beam is scanned.

Figure 2:
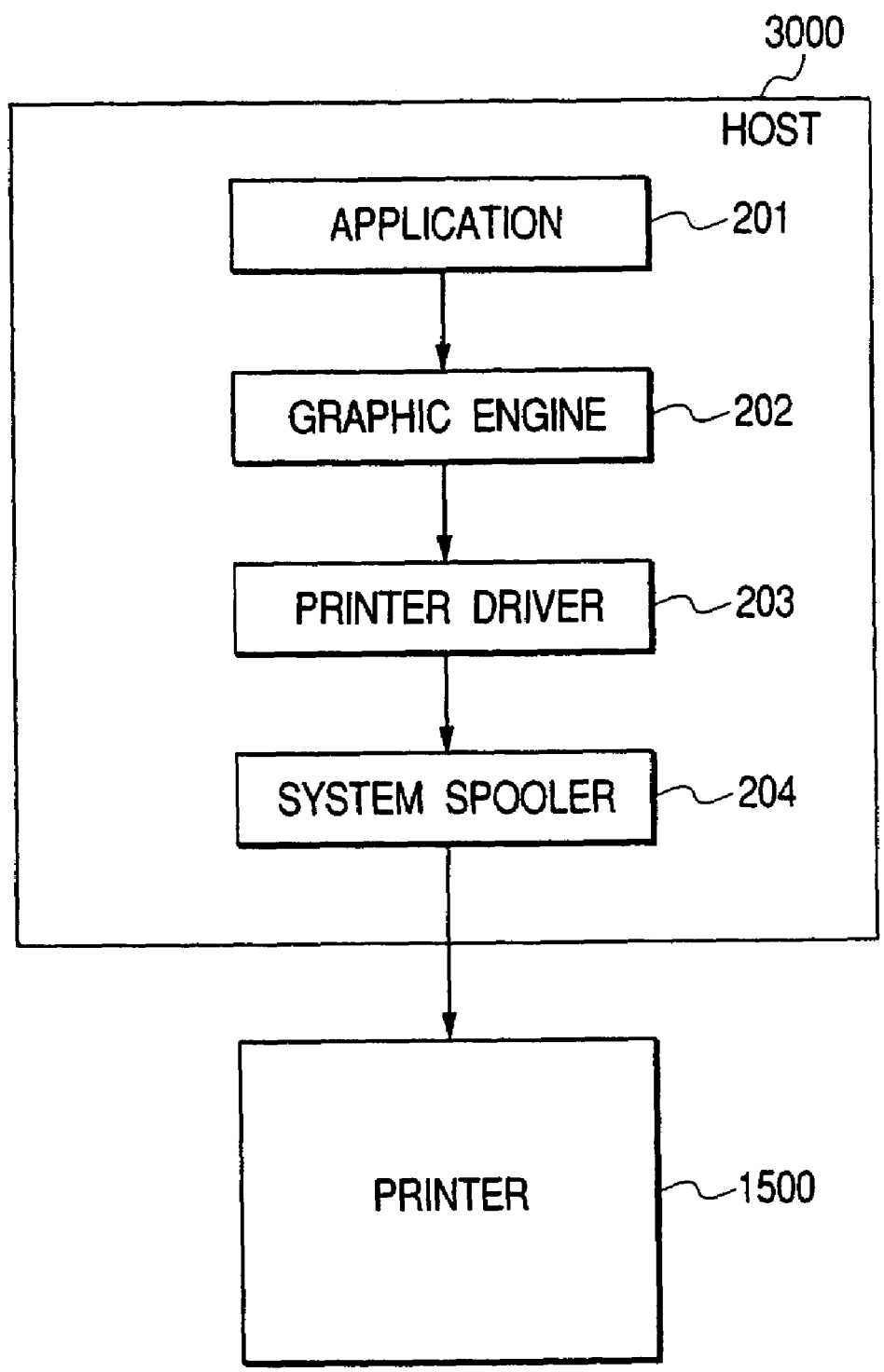
FIG. 2 is a block diagram showing a construction of a typical print system of a host computer to which a printer is connected.

FIG. 2 is a constructional diagram of a typical printer system in the host computer to which a printing apparatus such as a printer or the like is directly connected or connected via a network. An application 201, a graphic engine 202, a printer driver 203, and a system spooler 204 exist as files held in the external memory 111 and are program modules which are loaded into the RAM 102 by the OS or a module using such a module in the case where they are executed and executed. The application 201 and printer driver 203 can be added onto the FD or CD-ROM (not shown) of the external memory 111 or onto the HD of the external memory 111 via the network (not shown). Although the application 201 held in the external memory 111 is loaded into the RAM 102 and executed, when the printer 1500 is allowed to print from the application 201, the print data is outputted (drawn) by using the graphic engine 202 which has similarly been loaded into the RAM 102 and can be executed.

The graphic engine 202 similarly loads the printer driver 203 prepared every printer into the RAM 102 from the external memory 111 and sets an output of the application 201 into the printer driver 203. The graphic engine 202 converts a GDI (Graphic Device Interface) function as a draw output (constructed by a function which is defined by the OS) which is received from the application 201 into a DDI (Device Driver Interface) function which can be interpreted by the printer driver 203 and should be outputted and outputs the DDI function to the printer driver 203.

The printer driver 203 is shown as a suitable example of the print control program of the invention. On the basis of the DDI function received from the graphic engine 202, the printer driver 203 converts it into a control command, for example, a PDL (Page Description Language) which can be recognized by the printer. The converted printer control command is transmitted by the OS through the system spooler 204 loaded into the RAM 102 and outputted as print data to the printer 1500 via the interface 121.

Figure 3:
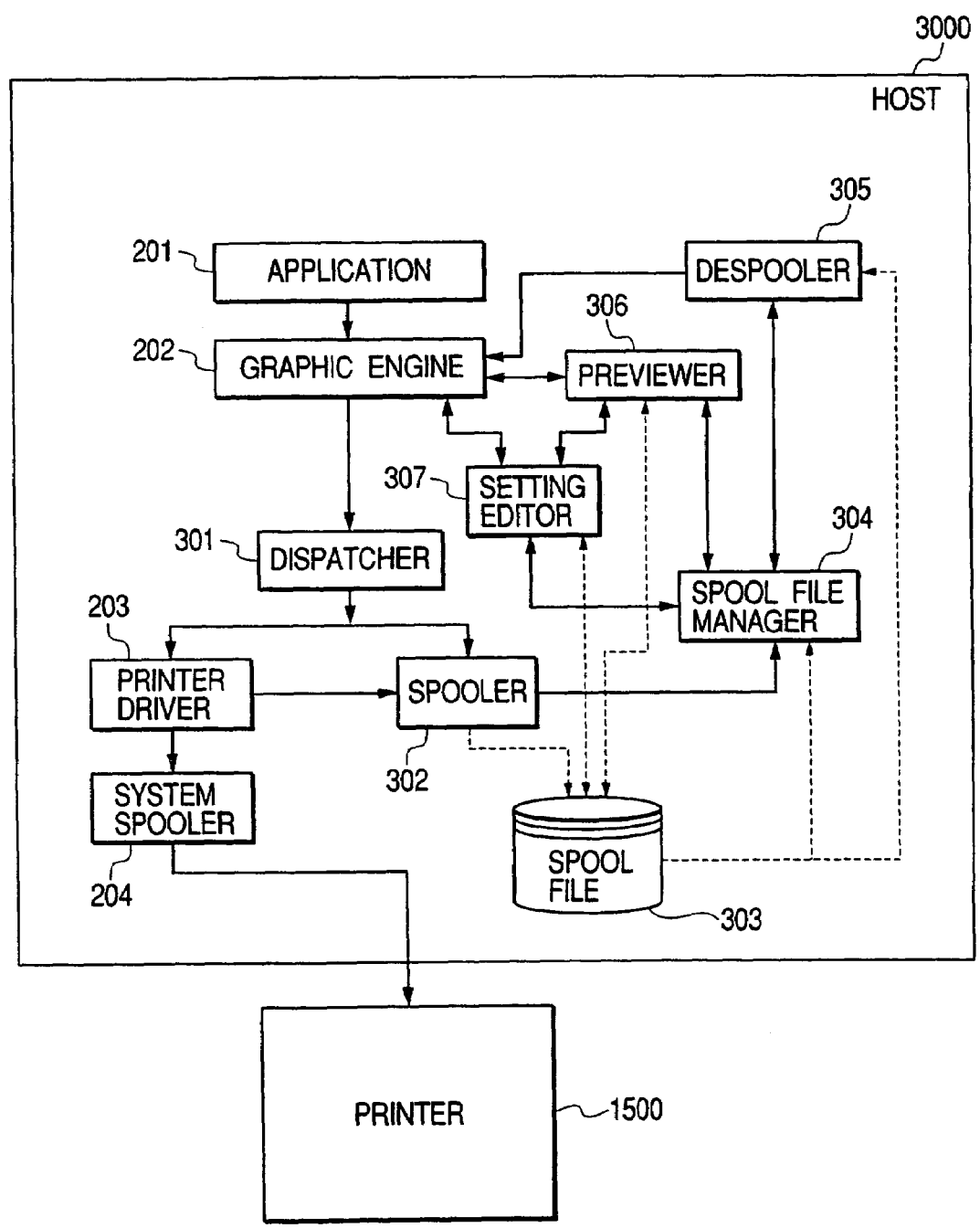
FIG. 3 is a block diagram showing a construction of a print system for temporarily spooling an intermediate code before a print command from an application is converted into a printer control command.

In addition to the print system comprising the printer and host computer shown in FIG. 2, the print system including the information processing apparatus of the embodiment further has a construction for temporarily spooling the print data from the application by intermediate code data as shown in FIG. 3. FIG. 3 shows a system obtained by expanding the system of FIG. 2. This system has a construction such that when a print command (DDI function) is sent from the graphic engine 202 to the printer driver 203, a spool file 303 comprising an intermediate code is formed once. In the system of FIG. 2, the application 201 is released from the printing process at a point of time when the printer driver 203 finishes to convert all of the print commands from the graphic engine 202 into the control commands of the printer. In the system of FIG. 3, the application 201 is released when a spooler 302 converts all of the print commands (DDI functions) into the intermediate code data and outputs them to the spool file 303. Unlike intermediate draw data which is generally formed by the printer at the start of the printing, with respect to the intermediate code data, since the rasterization or the like of the data is not performed, a time which is required until the application 201 is released from the printing process in case of the latter method of using the spool format is usually shorter than the former method. In the system shown in FIG. 3, contents in the spool file 303 can be modified as will be explained hereinlater with reference to FIG. 9 and the like. Thus, a function which the application does not have, that is, a function such as zooming (enlargement or reduction), print mode for reducing a plurality of pages and printing them into one page, or the like can be realized for the print data from the application.

To realize those purposes, the system of FIG. 2 is expanded so as to spool the print commands by the intermediate code data as shown in FIG. 3. To modify the print data, ordinarily, a setting is performed from a window which is provided by the printer driver 203 and the printer driver 203 holds the setting contents into the RAM 102 or external memory 111.

The details of FIG. 3 will be described hereinbelow. Each block in FIG. 3 shows a functional module and will be explained by using each module as a subject. However, actually, it is realized by a method whereby the CPU 101 executes the process on the basis of each program module (which has been stored in the ROM 103 or external memory 111 and is read out and stored into the RAM 102).

As shown in the diagram, according to the expanded processing method, a dispatcher 301 receives the DDI function as a print command from the graphic engine 202. If the print command (DDI function) received by the dispatcher 301 from the graphic engine 202 is based on the print command (GDI function) issued from the application 201 to the graphic engine 202, the dispatcher 301 loads the spooler 302 stored in the external memory 111 into the RAM 102 and sends the print command (DDI function) to the spooler 302 instead of the printer driver 203.

The spooler 302 analyzes the received print command (DDI function), converts it into the intermediate code on a page unit basis, and outputs it to the spool file 303 on a page unit basis. The term "page unit" used here denotes a page divided by the application (hereinafter, called a logical page), and it does not denote a page which is ejected by the printer (hereinafter, called a physical page). The spool file of the intermediate codes stored on a logical page unit basis is called a page draw file (PDF: Page Description File). The spooler 302 obtains print setting information as a print setting (N-up, duplex, staple, color/monochromatic designation, etc.) regarding the print data set by an input instruction from the user from the printer driver 203 with respect to the user interface which is provided by the printer driver 203, and stores it as a file of a job unit into the spool file 303. The setting file stored on a job unit basis is called a job setting file (abbreviated to SDF: also called a Spool Description File). This spool description file will be explained hereinlater.

Although the spool file 303 is generated as a file into the external memory 111, it can be also formed in the RAM 102. Further, the spooler 302 loads a spool file manager 304 stored in the external memory 111 into the RAM 102 and notifies the spool file manager 304 of a generating situation of the spool file 303. After that, the spool file manager 304 discriminates whether the printing can be performed in accordance with the contents of the print setting information as a print setting regarding the print data stored in the spool file 303 or not. This discrimination is made by discriminating whether the data which is drawn on the physical page (in case of a descending order printing, the last physical page; in case of a booklet printing, this page changes in dependence on a fascicle designation or the like) in which the job stored in the spool file 303 is first print-processed by the printer has been spooled or not. In the case where the relevant job is designation of "print" or "mail box" in accordance with the designation of the kind of job in FIG. 9, it is sufficient to make the discrimination as mentioned above. However, if it is the designation of "store" or "preview", since a preview and an editing process onto the host computer are accepted, even if the above discrimination is made, the print output is not performed but only the display output of the preview is performed.

In case of performing the print output on the basis of the above discrimination result, the following processes are executed. If the spool file manager 304 determined that the printing can be performed by using the graphic engine 202, a despooler 305 stored in the external memory 111 is loaded into the RAM 102 and an instruction is issued to the despooler 305 so as to execute the printing process of the page description file of the intermediate code described in the spool file 303.

The despooler 305 modifies the PDF of the intermediate code included in the spool file 303 in accordance with the SDF including the print setting information included in the spool file 303 and forms the GDI function again such that each logical page may match the physical page. The GDI function is outputted again via the graphic engine 202 in consideration of a new page command so that the printing process is performed every physical page. The graphic engine 202 as a part of the OS converts the draw command (GDI function) from the despooler 305 into the print command (DDI function) in a manner similar to the draw command from the application 201.

In the case where the print command (DDI function) received by the dispatcher 301 from the graphic engine 202 is based on the print command (GDI function) issued from the despooler 305 to the graphic engine 202, the dispatcher 301 sends the print command to the printer driver 203 instead of the spooler 302.

The printer driver 203 forms the printer control command comprising the page description language or the like on the basis of the DDI function obtained from the graphic engine 202 and outputs it to the printer 1500 via the system spooler 204.

Further, FIG. 3 shows an example in which in addition to the expansion system described so far, a previewer 306 and a setting editor 307 are arranged, thereby enabling a preview, a change in print setting, or a combination of a plurality of jobs to be performed.

Figure 9:
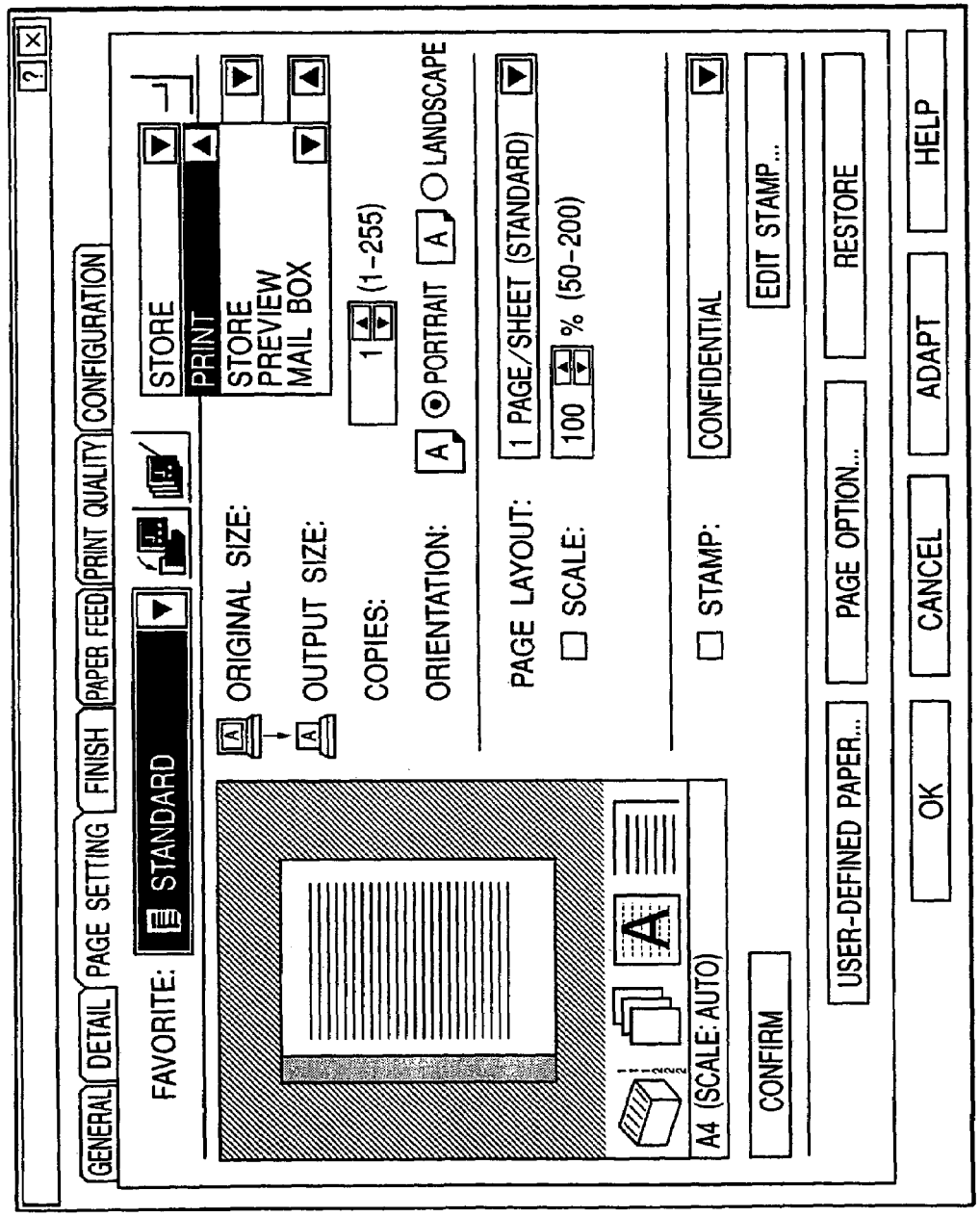
FIG. 9 shows an example of a user interface picture plane for performing a print spool setting which is provided by the printer driver.

In order to perform the print preview, change in print setting, or combination of a plurality of jobs, the user first needs to designate "store" in a pull-down menu as means for performing "designation of output destination" in a property of the printer driver shown in FIG. 9. If the user wants to see only the preview, such an operation can be also performed by selecting "preview" as designation of the output destination.

Figure 16:
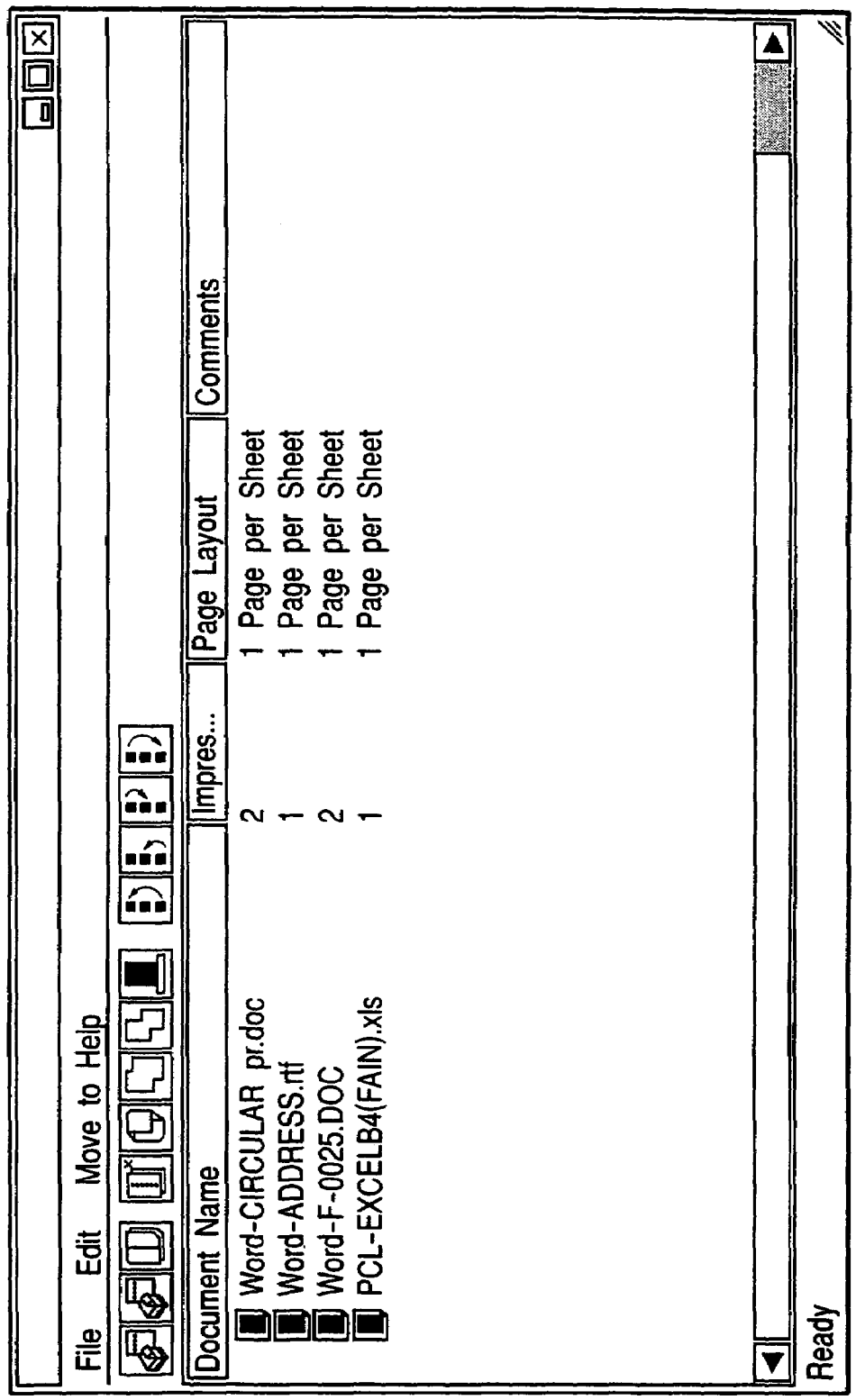
FIG. 16 shows an example of a picture plane for displaying a list of print jobs spooled by the spool file manager 304.

Contents set by the property of the printer driver as mentioned above are stored into a structure (called "DEVMODE" in the Windows OS) which is provided as a setting file by the OS. In this structure, for example, a setting about whether the data is stored into the spool file manager 304 or not is included in the print setting included in the spool file 303. The spool file manager 304 reads the print setting through the printer driver and if the "store" is designated, the PDF and SDF are generated and stored into the spool file 303 as mentioned above. A window picture plane of the spool file manager is popped up as shown in FIG. 16 and a list of the jobs spooled in the spool file 303 is displayed. FIG. 16 shows an example in which four jobs have been spooled. By pressing a menu bar or a menu icon under it, the operation of the job can be performed. The number of operations of the menu bar and that of the menu icon are equal. As kinds of operations, there are following twelve operations in a state where the job has been selected: "print"; "save and print" for printing while the spool file of the intermediate codes are left as they are; "preview" for seeing an output preview of the job which takes into consideration the print setting; "delete" for deleting the spool file of the intermediate codes; "copy" for forming a copy of the spool file of the intermediate codes; "combine" for obtaining one job by combining the jobs in the spool file of a plurality of intermediate codes; "divide" for dividing the combined job into a plurality of original jobs; "job edit" for changing the print setting (layout setting, finishing setting, or the like) of the single job or combined job; "move to head" for setting the print order of a certain job to the first order; "move upward by one" for making the print order of a certain job earlier by one; "move downward by one" for delaying the print order of a certain job by one; and "move to the last" for setting the print order of a certain job to the last order.

In the case where the preview of a certain single job or the combined job is designated on the window picture plane (FIG. 16) of the spool file manager, the previewer 306 stored in the external memory 111 is loaded into the RAM 102 and an instruction is issued to the previewer 306 so as to execute a previewing process of the job of the intermediate code described in the spool file 303.

The previewer 306 sequentially reads out the page description files (PDFs) of the intermediate codes included in the spool file 303, modifies them in accordance with contents of the print setting information included in the spool description file (SDF) stored in the spool file 303, and outputs the GDI function to the graphic engine 202. The graphic engine 202 outputs the draw data to the self client area, thereby enabling the data to be outputted on the screen.

The graphic engine 202 can perform a proper rendering in accordance with the designated output destination. Thus, in a manner similar to the despooler 305, the previewer 306 can be realized by a method whereby the intermediate codes included in the spool file 303 are modified in accordance with the contents of the print setting included in the spool file 303 and outputted by using the graphic engine 202. As mentioned above, the print setting set by the printer driver is stored as a spool description file into the spool file 303 and the data of the page description file is modified on the basis of the spool description file and outputted. Thus, how the actual draw data is printed can be provided to the user and, further, a print preview close to a print image that is outputted by the printer in accordance with each of the following cases can be provided to the user: that is, a case where the N-up mode (layout process for reducing N logical pages, arranging them into one physical page, and printing) has been designated, a case where the duplex printing has been designated, a case where the booklet printing has been designated, a case where a stamp has been designated, and the like. According to the preview function which the conventional application software such as document forming or the like has, since data is drawn on the basis of the page setting in the application, the print setting in the printer driver is not reflected, and it is impossible to allow the user to recognize the preview which is actually printed and outputted.

Figure 17:
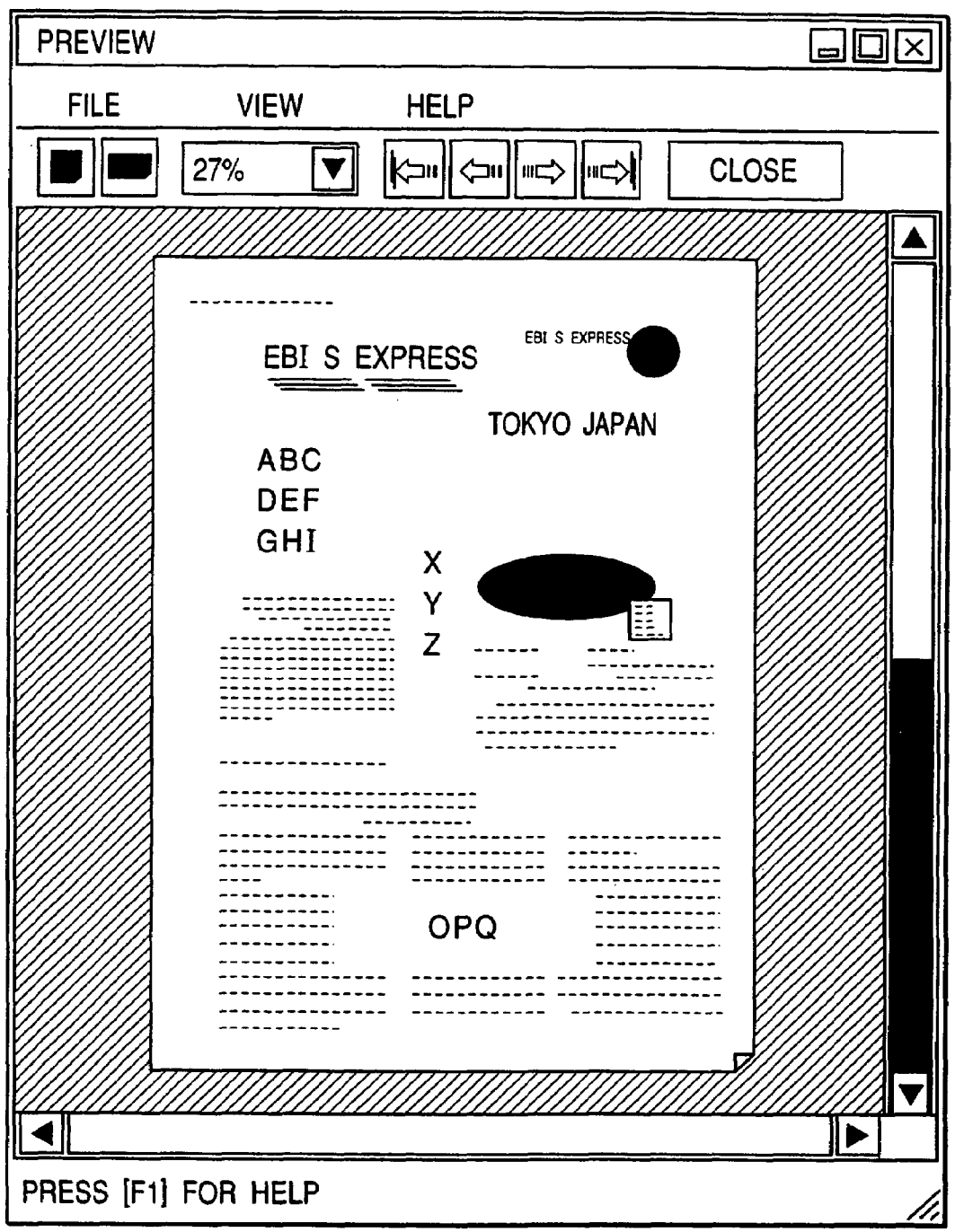
FIG. 17 shows an example of a picture plane of a previewer 306.

By executing the previewing process as mentioned above, a large preview of the print setting of the printing included in the spool file 303 as shown in FIG. 17 is displayed on the screen by the previewer 306. After that, the previewer 306 is closed by a non-display instruction of the user. A control routine is shifted to the window picture plane (FIG. 16) of the spool file manager.

If the user performs the printing in accordance with the contents displayed by the previewer 306, the print request is issued by instructing "print" or "save and print" on the spool file manager 304. As mentioned above, with respect to the print request, the page description file is modified on the basis of the spool description file and the GDI function is generated by the despooler 305 and transferred to the graphic engine 202. A print command is sent to the printer driver 203 via the dispatcher 301 and the printing is executed.

A setting change using the setting editor 307 will now be described.

As a method of realizing the setting change, the setting is possible with respect to the job which was designated to "store" in FIG. 9 in a manner similar to the preview. By a similar flow, the spool file manager 304 is popped up and a list of the spooled jobs is displayed. When "job edit" is designated and a setting change instruction is issued on the window picture plane (FIG. 16) of the spool file manager, the setting editor 307 stored in the external memory 111 is loaded into the RAM 102, and the setting editor 307 is instructed so as to display the present or default print setting. A job setting picture plane as shown in FIG. 18 is displayed.

Figure 18:
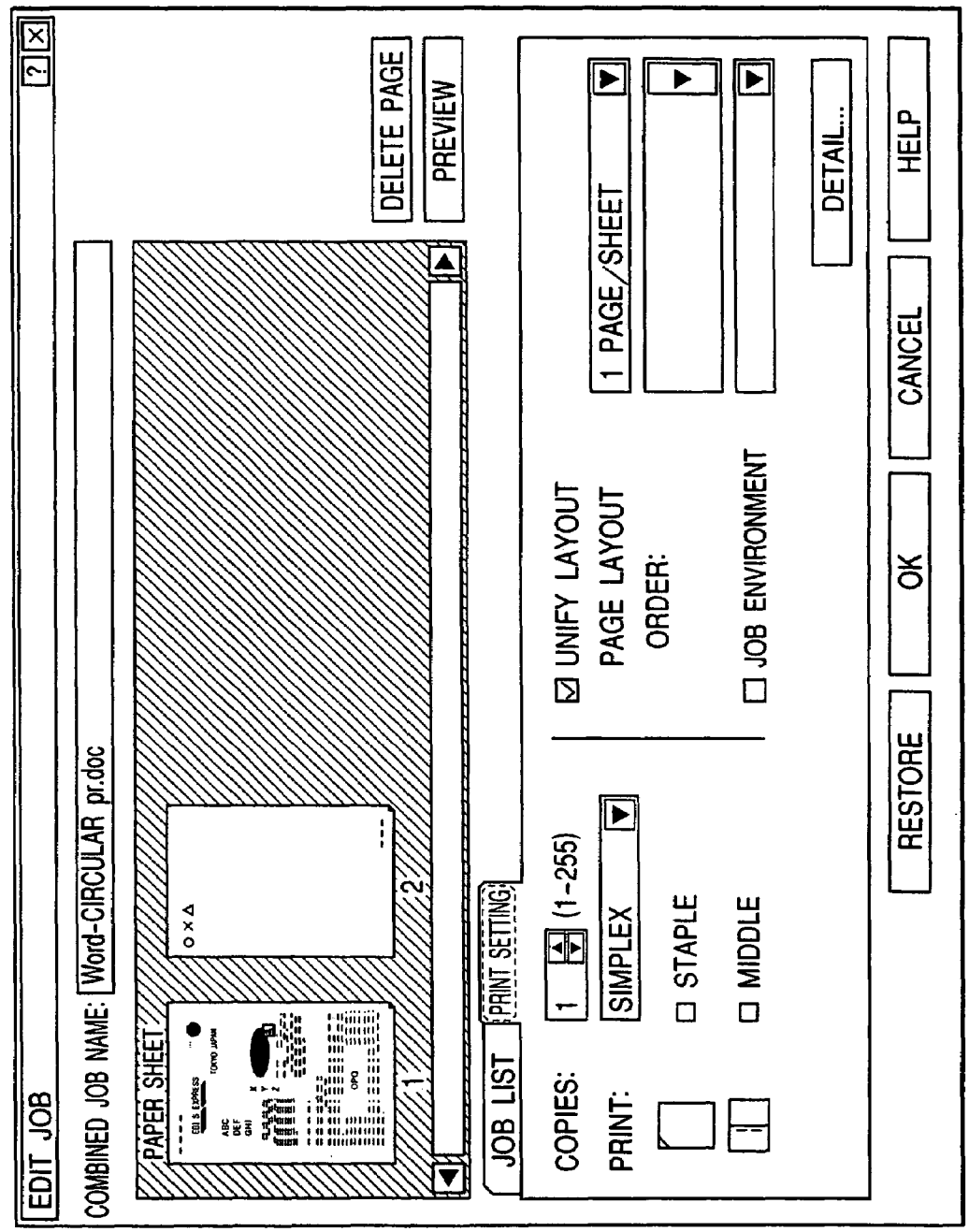
FIG. 18 shows an example of a picture plane of the setting editor 307.

The setting editor 307 obtains the spool description file of the job in which "job edit" has been designated from the spool file 303 and changes a default value of the job setting picture plane of FIG. 18 on the basis of the setting items designated in the spool description file. In the example shown in FIG. 18, the number of copies: 1, a printing method: simplex, staple: none, layout: 1 page/sheet, etc. have been designated in the spool description file of the job in which "job edit" has been designated.

Also according to the setting editor 307, the page description file of the intermediate codes included in the spool file 303 is modified in accordance with the contents of the print setting included in the spool description file stored in the spool file 303 and outputted to its own client area by using the graphic engine 202, so that a small preview can be outputted onto the screen shown in FIG. 18.

The print setting included in the spool description file stored in the spool file 303 can be changed and corrected here. In this instance, even if the user interface on the setting editor 307 has the items which can be set by the printer driver 203, the user interface of the printer driver 203 itself can be also called. As shown in FIG. 18, a fraction, a printing method (simplex, duplex, booklet printing), staple (saddle finisher or the like), a page layout, an arranging order, and the like can be designated. By pressing "detail", most of the items which can be designated by the printer driver can be reset. However, it is assumed that a change in setting regarding print quality such as resolution, graphic mode, or the like is not permitted.

With respect to the changed items, the change is authenticated in response to an authenticating request on the setting editor 307 and the control is shifted to the spool file manager 304. With respect to the setting items whose change was authenticated, the change of the print setting is held. However, it is not held in the original spool description file but a job setting file which is used in the job edition or the like is newly generated and held. The details of the job setting file will be explained hereinlater in FIG. 10 and subsequent drawings.

If the user performs the printing in accordance with the setting change contents in a manner similar to the confirmation in the previewer 306, the print request is issued on the spool file manager 304. The print request is sent to the graphic engine 202, the print command is supplied to the printer driver 203 via the dispatcher 301, and the printing is executed.

On the window picture plane (FIG. 16) of the spool file manager, it is also possible to designate the system in a manner such that a plurality of print jobs are combined and the printing is performed as one print job. In a manner similar to the preview and the setting change, the job in which the output destination is designated to "store" in the property of the printer driver in FIG. 9 is used as a prerequisite.

When the user combines the print jobs, first, the printer driver 203 is called from the application 201 and "store" is selected on the user interface as shown in FIG. 9. In a manner similar to that mentioned above, the files are stored into the spool file 303 by this selection and the window picture plane (FIG. 16) of the spool file manager is popped up as shown in FIG. 16. A list of the spooled jobs is displayed on the window of the spool file manager. By executing the similar operation from the application 201, a list of a plurality of jobs is displayed on the spool file manager 304.

When a plurality of jobs are selected and "combine" is designated, the setting editor 307 stored in the external memory 111 is loaded into the RAM 102 and the setting editor 307 is instructed so as to display the head job on the list or the print setting of default. A combined setting picture plane as shown in FIG. 18 is displayed. Although the setting editor 307 is used as a combined setting picture plane here, another module can be also used.

The setting editor 307 modifies the page description file of the intermediate codes included in the spool file 303 in accordance with the contents of the print setting included in the job setting information stored in the spool file 303 and outputs it to the self client area by using the graphic engine 202 in response to all of the jobs designated as a combined job, thereby outputting on the screen. In this instance, a small preview of all of the selected jobs can be performed to the preview area shown in FIG. 18. When the combined job is formed, the job setting file in which the spool description file of each single job has been expanded is generated. The job setting file is also generated in case of performing the job edition, one file is generated for one job, and one file is generated also in case of the combined job.

In response to each job, it can be displayed in the print setting before combining or can be also changed and corrected to a united print setting and displayed as a combined job. In this instance, the user interface on the setting editor 307 can also have the items which can be set by the printer driver 203 or the user interface of the printer driver 203 itself can be also called.

With respect to the combined job and the changed items, the change is authenticated in response to the authenticating request on the setting editor 307 as mentioned above, and the control is shifted to the spool file manager 304. By those operations, a plurality of jobs which were selected before are displayed as one combined job on the window of the spool file manager.

If the user performs the printing in accordance with the setting change contents in a manner similar to the confirmation in the previewer 306, the print request is issued on the spool file manager 304. The print request is sent to the graphic engine 202, the print command is sent to the printer driver 203 via the dispatcher 301, and the printing is executed.

Figure 4:
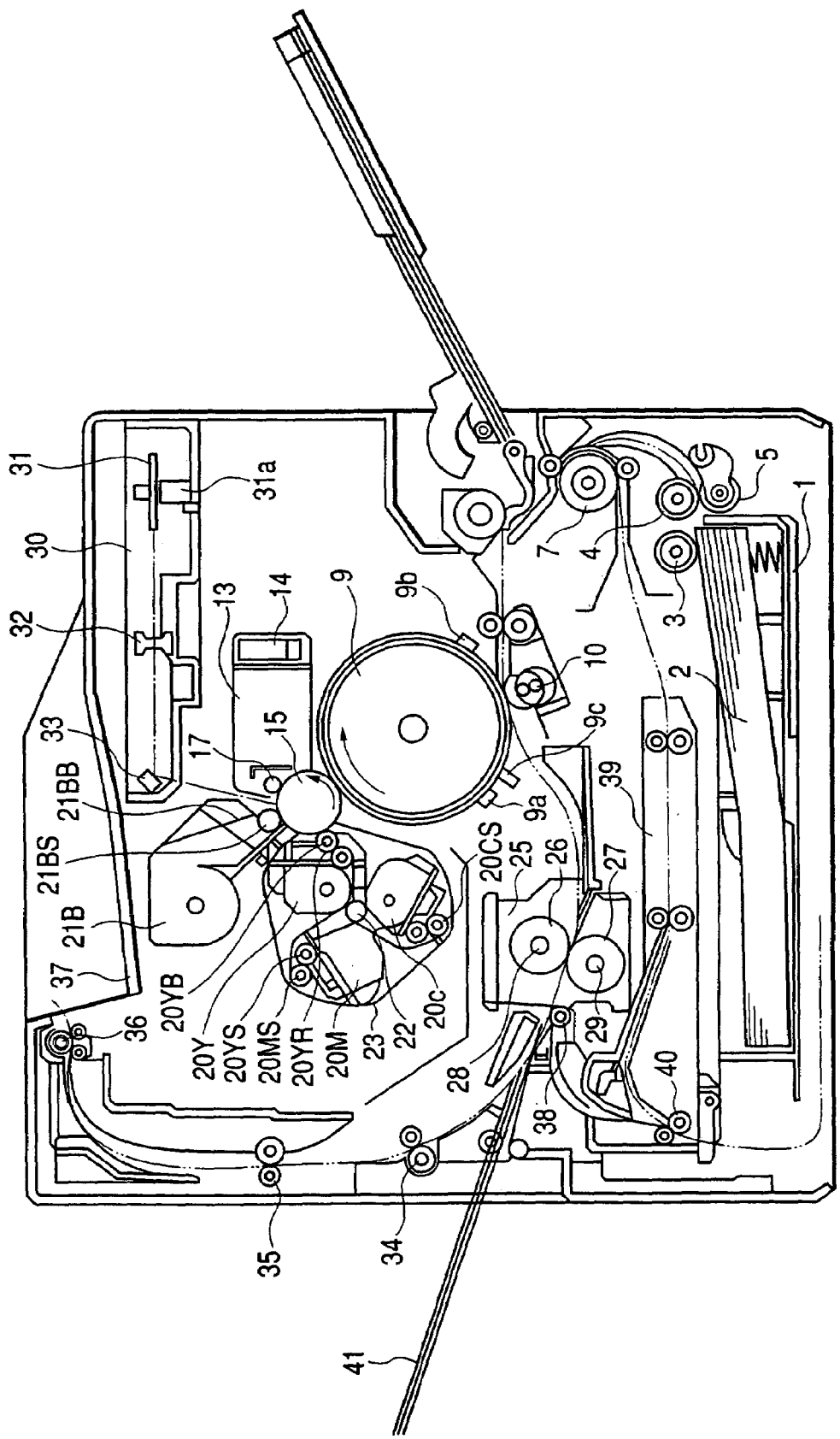
FIG. 4 is a diagram explaining the printer in the invention.

FIG. 4 is a cross sectional view of a color laser printer having a duplex printing function as an example of the printer 1500.

According to this printer, a laser beam modulated by image data of each color obtained on the basis of the print data inputted from the host computer 3000 is scanned onto a photosensitive drum 15 by a polygon mirror 31, thereby forming an electrostatic latent image. The electrostatic latent image is developed with toner to thereby obtain a visible image. The visible images are multiplexingly transferred onto an intermediate transfer material 9 with respect to all colors, thereby forming a color visible image. The color visible image is transferred onto a transfer material 2 (also called a recording medium) and the color visible image is fixed onto the transfer material 2 as a recording paper. An image forming unit for performing the above control is constructed by: a drum unit 13 having the photosensitive drum 15; a primary charging unit having a contact-type charging roller 17; a cleaning unit; a developing unit; a paper feeding unit including the intermediate transfer material 9, a sheet cassette 1, and various rollers 3, 4, 5, and 7; a transfer unit including a transfer roller 10; and a fixing unit 25. It is assumed that a counter (not shown) counts up whenever the laser beam is scanned onto the photosensitive drum 15 by the polygon mirror 31.

The drum unit 13 is formed by integratedly assembling the photosensitive drum (photosensitive material) 15 and a cleaner tank 14 which has a cleaning mechanism and also functions as a holder of the photosensitive drum 15. The drum unit 13 is detachably supported to the printer main body and can be easily exchanged in accordance with a life of the photosensitive drum 15. The photosensitive drum 15 is constructed by coating an organic photoconductive material layer onto an outer periphery of an aluminum cylinder and rotatably supported to the cleaner tank 14. A driving power of a drive motor (not shown) is transferred to the photosensitive drum 15, so that the drum is rotated. The drive motor rotates the photosensitive drum 15 counterclockwise in accordance with the image forming operation. By selectively exposing the surface of the photosensitive drum 15, the electrostatic latent image is formed. In a scanner unit 30, the modulated laser beam is reflected by the polygon mirror which is rotated by a motor 31a synchronously with a horizontal sync signal of the image signal and irradiates the photosensitive drum through a lens 32 and a reflecting mirror 33.

In order to develop the electrostatic latent image into a visible image, the developing unit comprises: three color developing devices 20Y, 20M, and 20C for developing the images of yellow (Y), magenta (M), and cyan (C); and one black developing device 21B for developing the image of black (B). The color developing devices 20Y, 20M, and 20C and the black developing device 21B have: sleeves 20YS, 20MS, 20CS, and 21BS; and coating blades 20YB, 20MB, 20CB, and 21BB which are come into pressure contact with outer peripheries of the sleeves 20YS, 20MS, 20CS, and 21BS, respectively. Coating rollers 20YR, 20MR, and 20CR are provided for the three color developing devices 20Y, 20M, and 20C.

The black developing device 21B is detachably attached to the printer main body. The color developing devices 20Y, 20M, and 20C are detachably attached to a developing rotary 23 which rotates around a rotary axis 22 as a rotational center, respectively.

The sleeve 21BS of the black developing device 21B is arranged so as to have a micro interval of, for example, about 300 µm for the photosensitive drum 15. The black developing device 21B conveys toner by a feeding member built therein and applies charges to the toner by frictional charging so as to be coated by the coating blade 21BB onto the outer periphery of the sleeve 21BS which rotates clockwise. By applying a developing bias to the sleeve 21BS, the development is performed to the photosensitive drum 15 in accordance with the electrostatic latent image, thereby forming a visible image onto the photosensitive drum 15 by the black toner.

The three color developing devices 20Y, 20M, and 20C are rotated in association with the rotation of the developing rotary 23 upon forming of the image, so that a predetermined one of the sleeves 20YS, 20MS, and 20CS faces the photosensitive drum 15 so as to have a micro interval of about 300 µm. Thus, the predetermined one of the color developing devices 20Y, 20M, and 20C stops at a developing position which faces the photosensitive drum 15 and a visible image is formed onto the photosensitive drum 15.

Upon forming of the color image, the developing rotary 23 is rotated every rotation of the intermediate transfer material 9. The developing steps are executed in the order of the yellow developing device 20Y, magenta developing device 20M, cyan developing device 20C, and black developing device 21B. The intermediate transfer material 9 is rotated four times. The visible images by the toner of yellow, magenta, cyan, and black are sequentially formed. Thus, a full color visible image is formed onto the intermediate transfer material 9.

The intermediate transfer material 9 is constructed so as to be come into contact with the photosensitive drum 15 and rotated in association with the rotation of the photosensitive drum 15. Upon forming of the color image, the intermediate transfer material 9 is rotated clockwise and subjected to a multiple transfer of the visible image of four times from the photosensitive drum 15. Upon forming of the image, the transfer roller 10, which will be explained hereinlater, is come into contact with the intermediate transfer material 9 and sandwiches and conveys the transfer material 2 in cooperation with the intermediate transfer material 9, thereby simultaneously multiplexingly transferring the color visible images on the intermediate transfer material 9 onto the transfer material 2. A TOP sensor 9a and an RS sensor 9b for detecting the position with respect to the rotating direction of the intermediate transfer material 9 and a concentration sensor 9c for detecting a concentration of the toner image transferred onto the intermediate transfer material are arranged on the outer peripheral portion of the intermediate transfer material.

The transfer roller 10 has a transfer charging device supported so as to be come into contact with or removed from the photosensitive drum 15 and formed by winding a foam elastic material having a middle resistance around a metal axis.

As shown by a solid line in FIG. 4, the transfer roller 10 is apart from and located below the intermediate transfer material 9 while the color visible image is multiplexingly transferred onto the intermediate transfer material 9. After the color visible images of four colors are formed onto the intermediate transfer material 9, the transfer roller 10 is moved to an upward position shown by a dotted line shown in the diagram by a cam member (not shown) in accordance with timing for transferring the color visible image onto the transfer material 2. Thus, the transfer roller 10 is come into pressure contact with the intermediate transfer material 9 through the transfer material 2 by a predetermined pressing force and a bias voltage is applied thereto, so that the color visible image on the intermediate transfer material 9 is transferred onto the transfer material 2.

The fixing unit 25 fixes the transferred color visible image while conveying the transfer material 2 and has: a fixing roller 26 for heating the transfer material 2; and a pressing roller 27 for allowing the transfer material 2 to be come into pressure contact with the fixing roller 26. Each of the fixing roller 26 and pressing roller 27 is formed in a hollow shape and heaters 28 and 29 are built in them, respectively. That is, the transfer material 2 holding the color visible image is conveyed by the fixing roller 26 and pressing roller 27 and the toner is fixed onto the surface of the transfer material 2 by applying heat and pressure.

After the visible image was fixed, the transfer material 2 is ejected to a face-down paper ejecting unit 37 by paper ejecting rollers 34, 35, and 36 and the image forming operation is finished.

Cleaning means is provided for cleaning the toner remaining on the photosensitive drum 15 and intermediate transfer material 9. The drain toner remaining after the visible image by the toner formed on the photosensitive drum 15 was transferred onto the intermediate transfer material 9 or the drain toner remaining after the color visible images of four colors formed on the intermediate transfer material 9 were transferred onto the transfer material 2 is stored into the cleaner tank 14.

The transfer material (recording paper) 2 onto which the image data is printed is picked up from the paper feed tray 1 by the paper feed roller 3 and conveyed in a state where it is sandwiched between the intermediate transfer material 9 and transfer roller 10. A color toner image is recorded onto the transfer material 2. Thereafter, the recording paper 2 passes through the fixing unit 25 and the toner image is fixed. In case of the simplex print mode, a conveying path is formed so that a flapper (guide member) 38 guides the recording paper to the upper paper ejecting unit. In case of the duplex print mode, however, a conveying path is formed so that the flapper 38 guides the recording paper to a duplex unit provided at a lower stage of the printer main body.

The recording paper guided to the duplex unit is fed once to a lower portion (conveying path shown by an alternate long and two dashes line) of the tray 1 by a conveying roller 40 and, thereafter, it is conveyed in the opposite direction and fed to a duplex path 39. On the duplex path 39, the obverse/reverse state of the paper and the front/back state regarding the conveying direction are opposite to those in a state where it is put on the paper feed tray 1. In this state, the recording paper is conveyed again in the direction of the photosensitive drum 15. By transferring and fixing the toner image again, the duplex print can be performed.

Reference numeral 41 denotes a face-up paper ejecting unit. The recording paper on which the toner was fixed is ejected by the conveying roller 40 in a face-up state where the print surface faces upward. The printer (printing apparatus) as a transmission destination of the print data, which will be explained in the embodiment has the face-up paper ejecting unit 41 and face-down paper ejecting unit 37.

A feature of the invention will now be described with respect to a preferred embodiment.

A memory medium in which a program (printer driver 203 (which can also include the dispatcher 301, spooler 302, spool file manager 304, and despooler 305)) for generating the print data to be print-processed by the printer as a printing apparatus which is suitable for the invention has been stored is implemented into the information processing apparatus so that each program module can be executed. The information processing apparatus (host computer 3000) includes: a designation receiving module for receiving the designation of the duplex print from the printer driver 203 (the spool file manager 304 receives it through the spooler 302); a discriminating module (despooler 305) for discriminating the number of entire pages in the case where the print data which is print-processed in the printer is arranged onto the recording paper; and a command adding module (despooler 305) for receiving the designation of the duplex print by the designation receiving module and, when it is determined by the discriminating module that the number of entire pages on the recording paper on which the data to be printed has been arranged is equal to an odd number, adding a command to urge the forced paper ejection in the printer lest the blank page of the last page is logically counted in the printer.

The information processing apparatus further includes a user interface providing module (printer driver 203) for providing user interfaces (UI shown in FIGS. 8, 9, 18, etc.) for designating the print setting. The designation receiving module receives the designation of the duplex print in accordance with the print setting which is inputted through the user interface.

The command which is used for urging the forced paper ejection and added by the command adding module is a paper designating command to designate a paper size different from the paper size designated at present by the printing process.

The information processing apparatus further includes: a spooling module (spooler 302) for converting the print command (DDI function) which is received by the application (201) through the OS (graphic engine 202) into an intermediate data format and temporarily storing it; and a despooling module (despooler 305) for issuing the print command (GDI function) again to the OS by a data format that is outputted by the application from the stored data. In the case where the duplex print is designated and the number of pages of the recording paper on which the data to be printed has been arranged is equal to the odd number, the despooling module issues a print command added with an escape command (FIG. 22) so that the command to urge the forced paper ejection is added in the command adding step.

The information processing apparatus further includes a print data forming module (printer driver 203) for forming the print data (including the printer control command) which is processed in the printer on the basis of the print command (DDI function) which is received through the OS (graphic engine 202). If the paper is ejected to the face-up paper ejecting unit (paper ejecting unit 41) in the printer in which the printing process of the reverse side is first executed in the duplex print mode, when the duplex print mode is designated and the number of pages of the recording paper on which the data to be print-processed in the printer has been arranged is equal to the odd number, the print data forming module forms the print data whose page order has been controlled so that the face-down paper ejection is executed in the face-up paper ejecting unit (FIG. 24B).

Figure 24A:
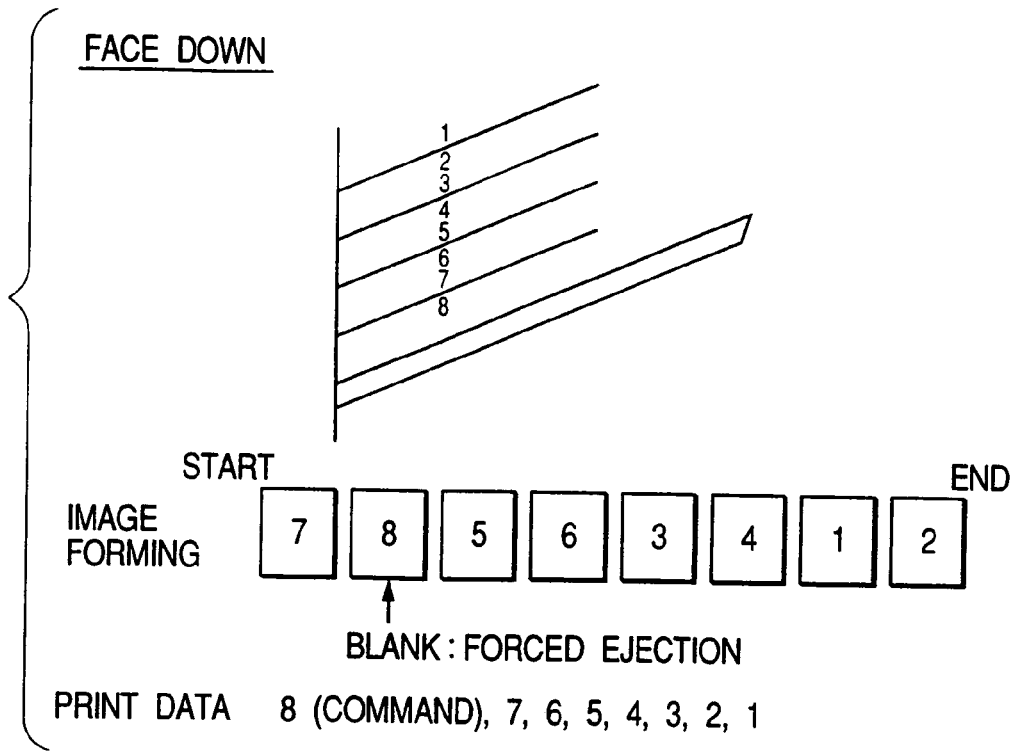
FIGS. 24A and 24B are diagrams showing a relation between a print surface in a paper ejecting unit and a print surface of a printed matter and a page order of the print data which is transmitted from the information processing apparatus.
Figure 24B:
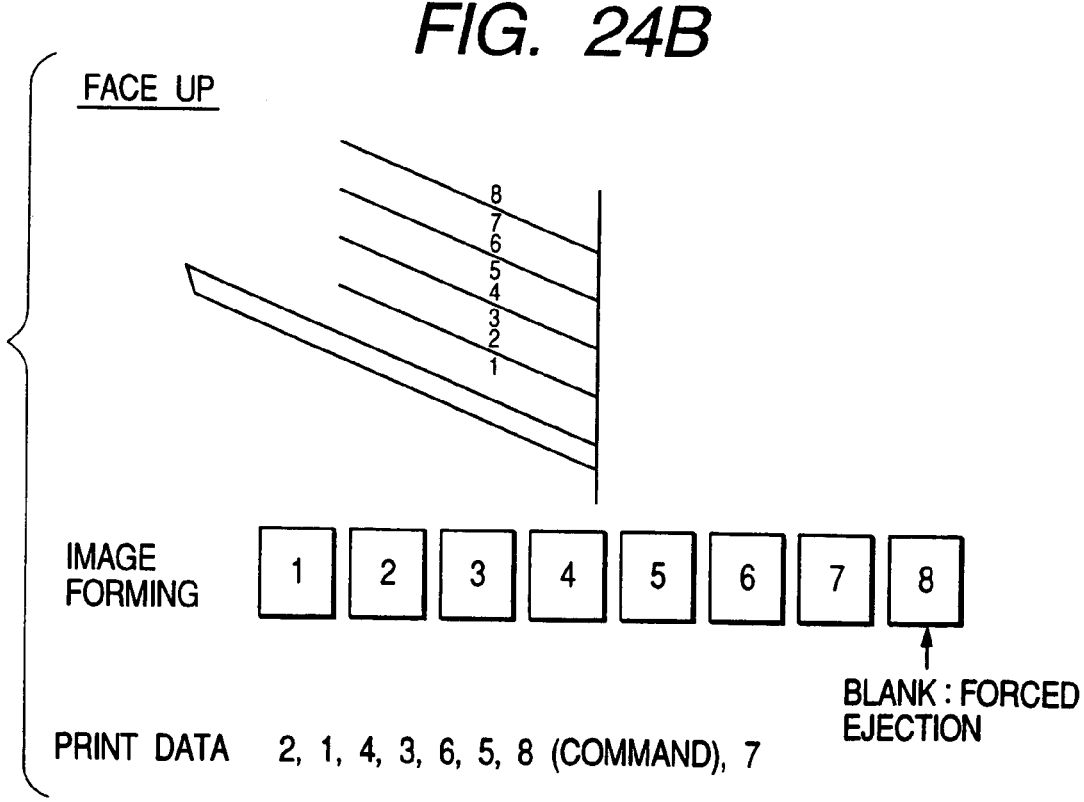

If the paper is ejected to the face-down paper ejecting unit (paper ejecting unit 37) in the printer in which the printing process of the reverse side is first executed in the duplex print mode, when the duplex print mode is designated and the number of pages of the recording paper on which the data to be print-processed in the printer has been arranged is equal to the odd number, the print data forming module forms the print data whose page order has been controlled so that the face-up paper ejection is executed in the face-down paper ejecting unit (FIG. 24A).

Characteristic processes of the invention will now be described hereinbelow with reference to a flowchart when it is seen from each module.

Figure 5:
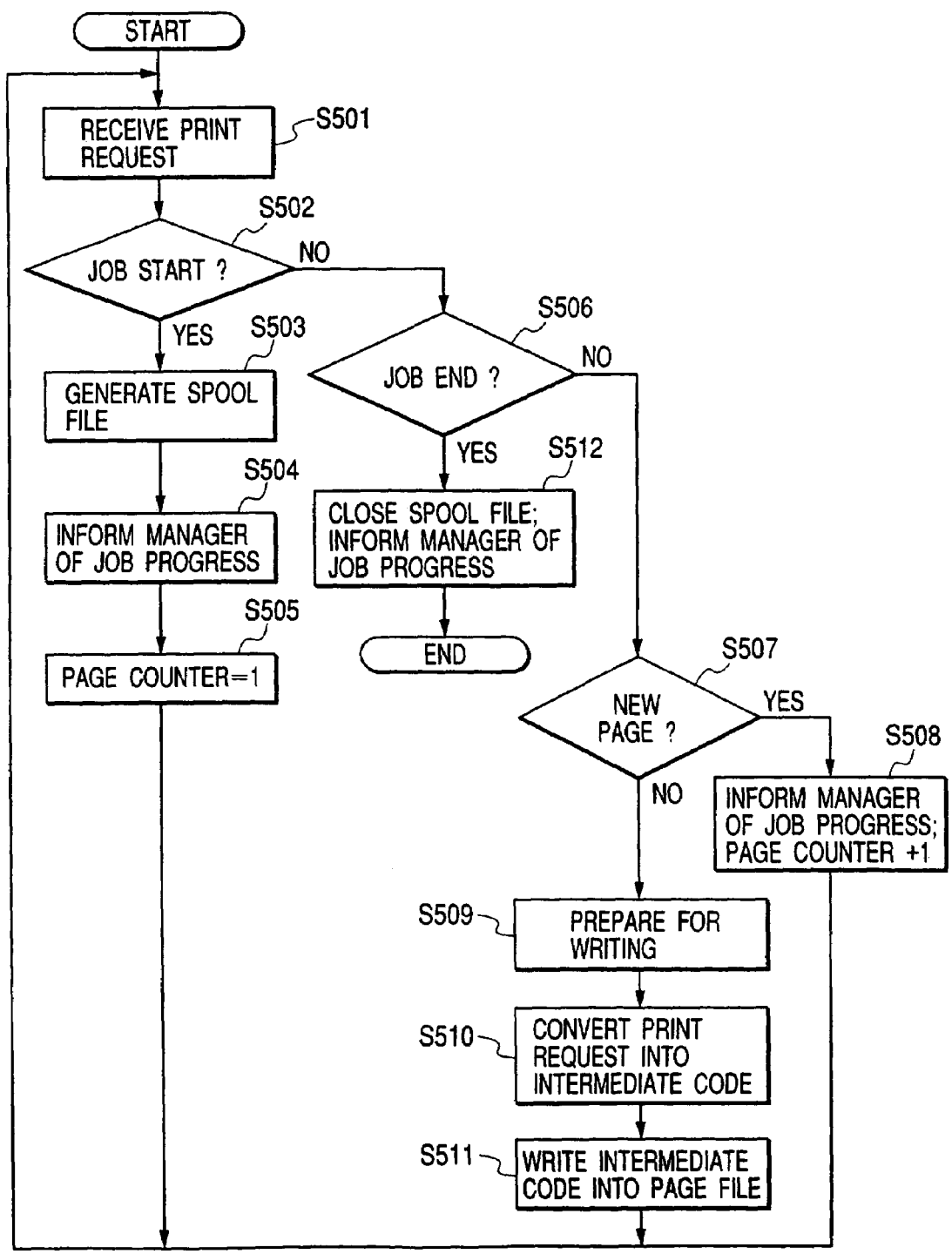
FIG. 5 is a flowchart showing processes in a spooler 302.

FIG. 5 is a flowchart showing processes in a page-unit holding step in the generation of the spool file 303 in the spooler 302. As mentioned above, the processes in this flowchart will be also described by using each module as a subject. However, it is realized by a method whereby the CPU 101 executes each process on the basis of the program codes described in each module.

Figure 8:
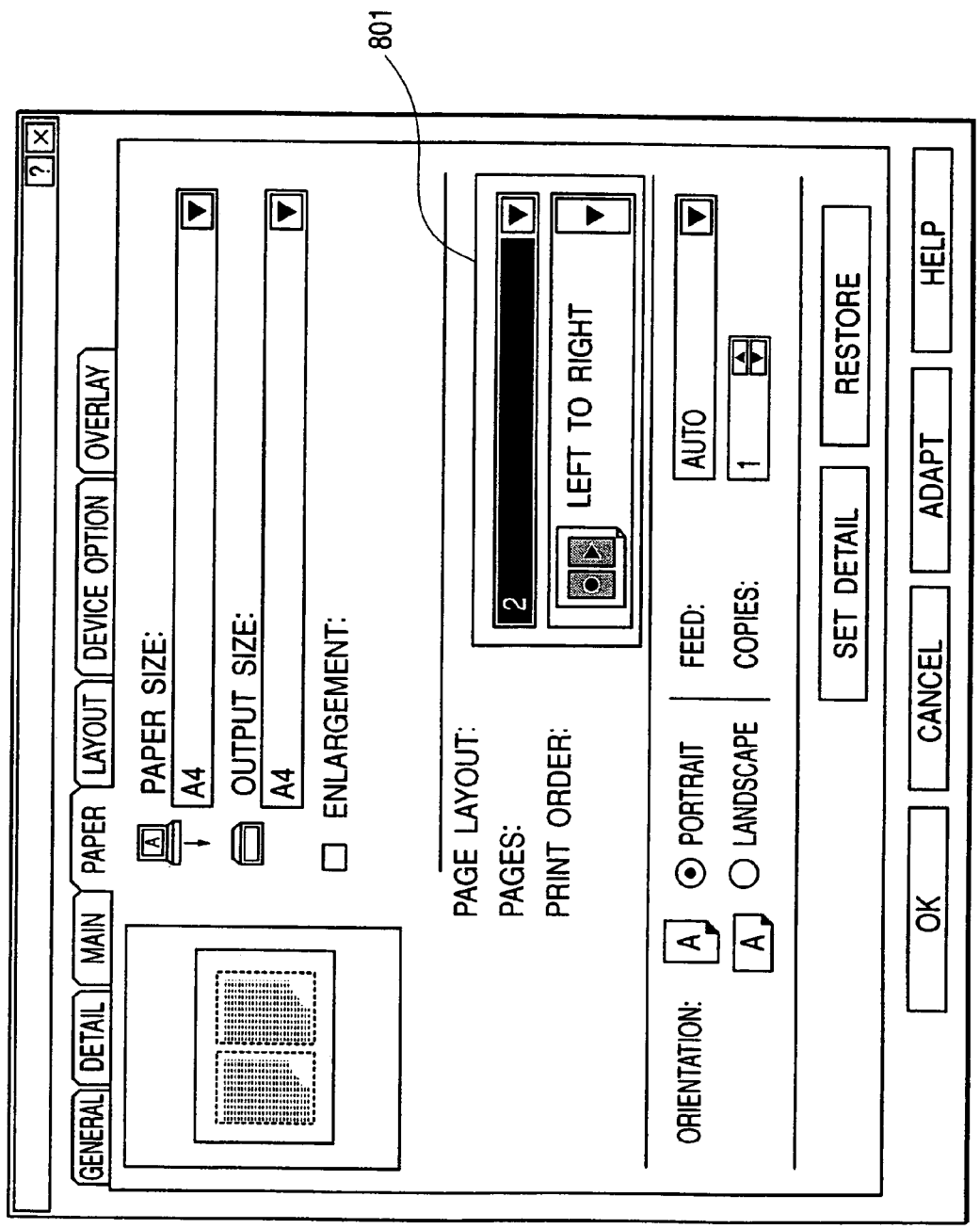
FIG. 8 shows an example of a user interface picture plane for inputting a print setting which is provided by a printer driver.

First, in step 501, the spooler 302 receives the print request from the application through the graphic engine 202. In the application, a dialogue for inputting the print setting as shown in FIG. 8 is displayed and the print setting inputted from this dialogue is sent from the printer driver to the spooler 303. In the setting input diagram shown in FIG. 8, a setting item 801 to decide the number of logical pages which are arranged on one physical page and the like are included.

In step 502, the spooler 302 discriminates whether the received print request is a job start request or not. If it is determined in step 502 that it is the job start request, step 503 follows. The spooler 302 generates the spool file 303 for temporarily storing the intermediate data. Subsequently, in step 504, the spooler 302 notifies the spool file manager 304 of job progress of the printing process. In step 505, a count value of a page number counter of the spooler 302 is initialized to "1". In the spool file manager 304, the information of the job, the print setting, and the like with respect to the job whose printing has been started are read out from the spool file 303 and stored.

If it is determined in step 502 that the received print request is not the job start request, step 506 follows.

In step 506, the spooler 302 discriminates whether the received print request is a job end request or not. If it is determined in step 506 that it is not the job end request, step 507 follows and whether it is a new-page request or not is discriminated. If it is determined in step 507 that it is the new-page request, step 508 follows. The spooler 302 notifies the spool file manager 304 of the job progress of the printing process. The count value of the page number counter is increased by "1". The page description file in which the intermediate codes have been stored is closed and the next page description file is generated.

If it is determined in step 507 that the received print request is not the new-page request, step 509 follows. The spooler 302 prepares for writing the intermediate codes into the page description file.

Subsequently, in step 510, the spooler 302 executes the process for converting the print request into the intermediate code of the DDI function in order to store the print request into the spool file 303. In step 511, the spooler 302 writes the print request (intermediate code) converted into a form which can be stored in step 510 into the page description file in the spool file 303. After that, the processing routine is returned to step 501 and the print request from the application is received again. The series of processes in steps 501 to 511 is continued until the job end request (End Doc) is received from the application. The spooler 302 simultaneously obtains the information such as print setting and the like stored in the DEVMODE structure from the printer driver 203 and stores it as a spool description file into the spool file 303. On the other hand, if it is determined in step 506 that the print request from the application is the job end request, since all of the print requests from the application are finished, step 512 follows. The spooler 302 notifies the spool file manager 304 of job progress of the printing process. The processing routine is finished.

Figure 6:
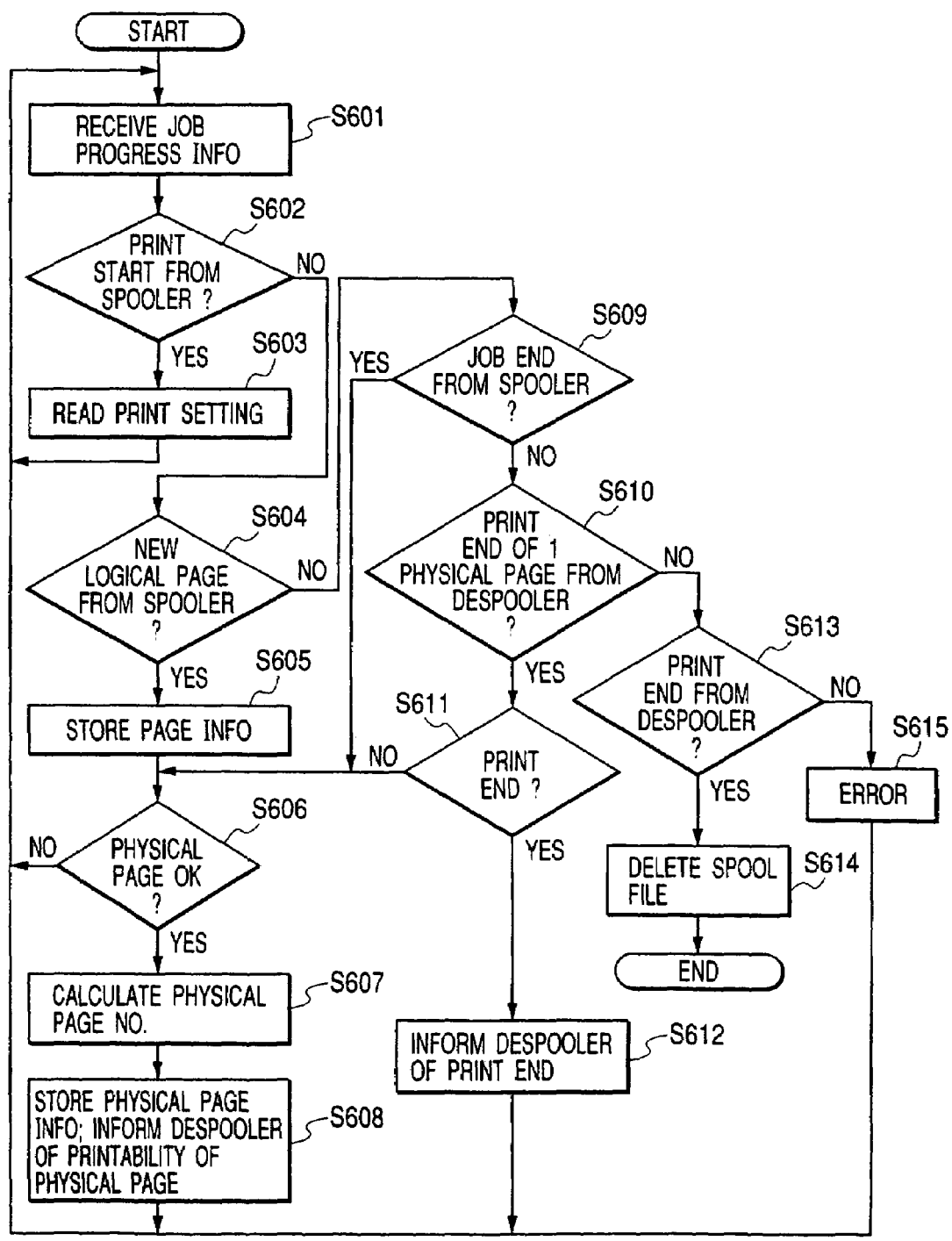
FIG. 6 is a flowchart showing a print control in a spool file manager 304.

FIG. 6 is a flowchart showing the details of the control between the process for generating the spool file 303 and a print data forming process, which will be explained hereinlater in the spool file manager 304.

In step 601, the spool file manager 304 receives the notification of the job progress of the printing process from the spooler 302 or despooler 305.

In step 602, the spool file manager 304 discriminates whether the notification of the job progress is a notification of the print start from the spooler 302 that is notified in step 504 mentioned above or not. If YES, step 603 follows, the print setting is read out from the spool file 303 and the management of the job is started. If it is determined in step 602 that it is not the print start notification from the spooler 302, step 604 follows. The spool file manager 304 discriminates whether the notification of the job progress is a notification of the print end of one logical page from the spooler 302 that is notified in step 508 mentioned above or not. If it is decided in step 604 that it is the print end notification of one logical page, step 605 follows. The logical page information corresponding to this logical page is stored. In subsequent step 606, whether the printing of one physical page can be started for n logical pages whose spooling has been finished at this time point or not. If YES, step 607 follows and the physical page number is determined from the number of logical pages which are allocated to one physical page to be printed.

With respect to the calculation of the physical page, for example, in case of the print setting such that four logical pages are arranged on one physical page, the first physical page can be printed when the fourth logical page has been spooled. Subsequently, the second physical page can be printed when the eighth logical page has been spooled.

Even if the number of entire logical pages is not a multiple of the number of logical pages which are arranged on one physical page, the number of logical pages which are arranged on one physical page can be determined by the spool end notification in step 512.

In step 608, the information of the numbers of the logical pages constructing the physical page which can be printed, the physical page number, and the like is stored into the job setting file (file including the physical page information) in a format as shown in FIG. 10. The despooler 305 is notified of the fact that the physical page information of an amount as much as one physical page has been added. After that, the processing routine is returned to step 601 and the apparatus waits for the next notification. In the embodiment, even if all of the spools of the print job are not finished, the printing process can be executed when one page of the print data, that is, the logical pages constructing one physical page have been spooled.

If it is decided in step 604 that the notification of the job progress is not the job end notification of one logical page from the spooler 302, step 609 follows. The spool file manager 304 discriminates whether the notification of the job progress is the job end notification from the spooler 302 that is notified in step 512 mentioned above or not. If it is the job end notification, step 606 follows. If NO, step 610 follows and the spool file manager 304 discriminates whether the received notification is the print end notification of one physical page from the despooler 305 or not. If it indicates the print end notification of one physical page, step 611 follows and whether the entire printing of the print setting has been finished or not is, discriminated. If YES, step 612 follows and the despooler 305 is notified of the print end. If it is determined in step 611 that the printing for the print setting is not finished yet, step 606 follows. In the embodiment, the despooler 305 presumes that the number of physical pages is set to one as a unit of executing the printing process. In step 608, the information necessary for executing the printing process of one physical page is successively stored into the file in a form such that it can be used again. In the case where it is unnecessary to use it again, however, it is also possible to construct the apparatus in a manner such that a processing speed and an amount of resources are saved by a method of sequentially overwriting the information on a physical page unit basis by using a high-speed memory medium such as a common memory or the like. If the job progress speed of the spool is faster than that of the despool or if the despool is started from the end of the spool of all pages, page printability is not notified every physical page in step 608 but contents showing that a plurality of physical pages or all physical pages can be printed in accordance with the job progress on the despool side are notified, thereby enabling the number of times of notification to be saved.

If it is determined in step 610 that the received notification is not the print end notification of one physical page from the despooler 305, step 613 follows. The spool file manager 304 discriminates whether it indicates the print end notification from the despooler 305 or not. If it is determined that the notification is the print end notification from the despooler 305, step 614 follows. The spool file manager 304 deletes the relevant page description file in the spool file 303 and finishes the processing routine. If it is not the print end notification from the despooler 305, step 615 follows. The apparatus executes other ordinary processes and waits for the next notification.

Figure 7:
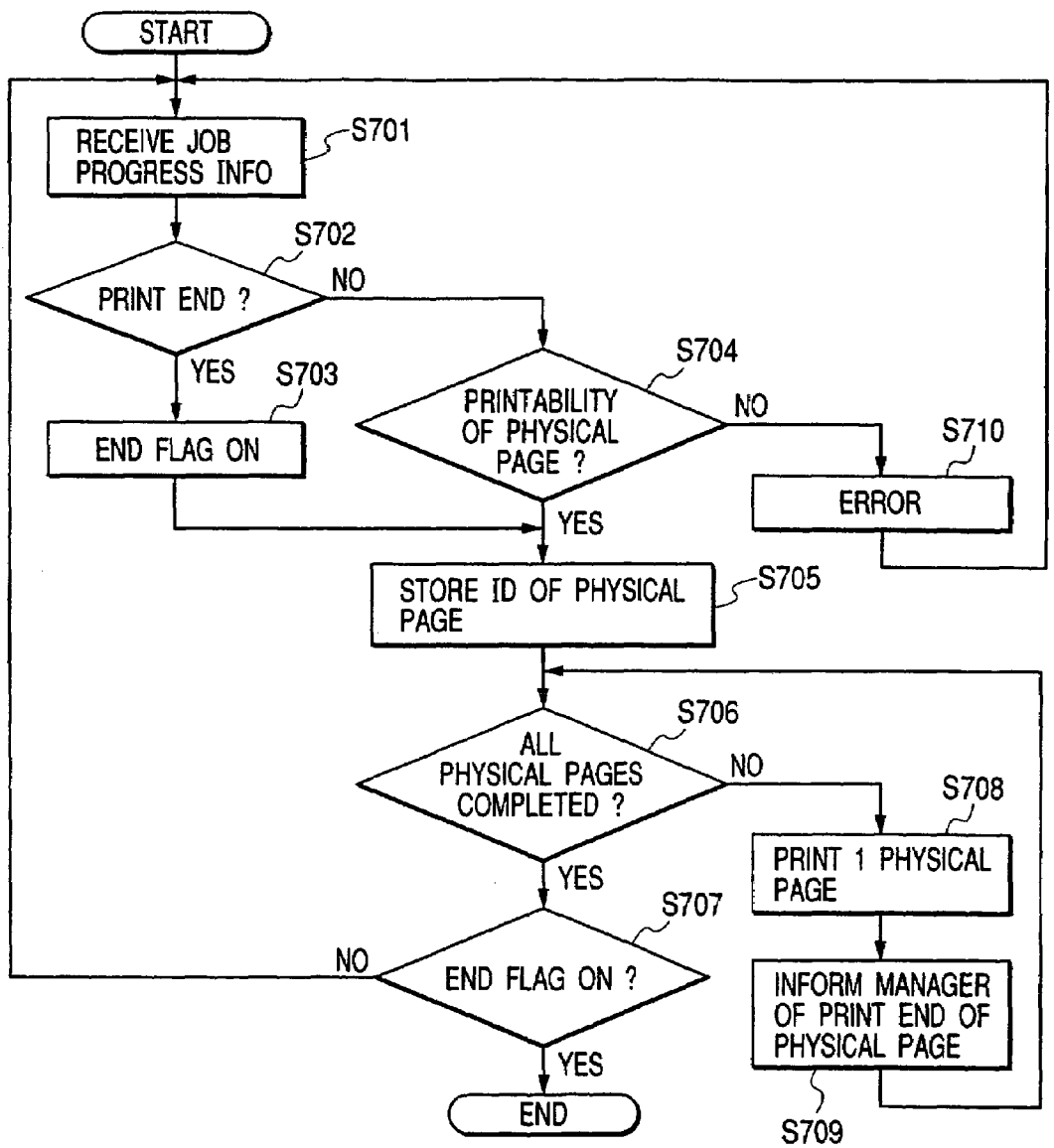
FIG. 7 is a flowchart showing processes in a despooler 305.

FIG. 7 is a flowchart showing details of the print data forming process in the despooler 305.

The despooler 305 reads out the necessary information (page description file and spool description file) from the spool file 303 in response to the print request from the spool file manager 304 and forms the print data. A method of transferring the formed print data to the printer is as described in FIG. 3.

In the forming of the print data, first, in step 701, the despooler 305 receives the notification from the spool file manager 304. In subsequent step 702, the despooler 305 discriminates whether the received notification is the job end notification or not. If it is the job end notification, step 703 follows and an end flag is set to ON. The processing routine advances to step 705. If it is not the job end notification in step 702, step 704 follows. The despooler 305 discriminates whether the print start request of one physical page in step 608 has been notified or not. If it is determined in step 704 that the print start request is not notified, step 710 follows and other error process is executed. The processing routine is returned to step 701. The apparatus waits for the next notification. If it is decided in step 704 that the print start request of one physical page has been notified, step 705 follows. The despooler 305 stores an ID of the printable physical page which received the notification in step 704. In step 706, the despooler 305 discriminates whether the printing process has been finished with respect to all pages of the physical page ID stored in step 705 or not. If the process of all physical pages has been finished, step 707 follows and whether the end flag has been set to ON in step 703 or not is discriminated. If the end flag is ON, it is regarded that the printing of the job has been finished. The spool file manager 304 is notified of the end of the process of the despooler 305. The processing routine is finished.

If it is decided in step 707 that the end flag is not ON, the processing routine is returned to step 701 and the apparatus waits for the next notification. If it is decided in step 706 that the printable physical page remains, step 708 follows. The despooler 305 sequentially reads out the IDs of the unprocessed physical pages from the stored physical page IDs, reads the information necessary for forming the print data of the physical pages corresponding to the read-out physical page IDs, and executes the printing process.

In the printing process, the print request command stored in the spool file 303 is converted into the format (GDI function) which can be recognized by the graphic engine 202 in the despooler 305 and transferred.

With respect to the print setting such that a plurality of logical pages are arranged on one physical page (hereinafter, referred to as an N-up printing) as described in the embodiment, the print request command is converted in consideration of a reduction layout in this step. After completion of the necessary printing process, in subsequent step 709, the spool file manager 304 is notified of the end of forming of the print data of one physical page. The processing routine is returned to step 706 and the above processes are repeated until the printing process is executed with respect to all of the printable physical page IDs stored in step 705.

A flow of the printing process using the dispatcher 301, spooler 302, spool file manager 304, and despooler 305 has been described above. By processing as mentioned above, since the application 201 is released from the printing process at timing when the spooler 302 forms the intermediate code and stores it into the spool file 303, the processing time is shorter than the time which is required in case of directly outputting to the printer driver 203. Since the intermediate code is temporarily stored into the spool file 303 as an intermediate file (page description file, spool description file) which takes into consideration the print setting of the printer driver, the user is enabled to recognize the print preview for the actual printing or the print jobs formed by a plurality of applications can be combined or rearranged. Also in case of changing the print setting, the user is enabled to change the print setting without activating the application and printing again.

In the printing process using the spooler 302, the job setting file is generated when the graphic engine 202 is requested to print by the despooler 305. However, also in case of showing the preview, performing the job combination, or the like, the job setting file is generated. The job setting file is equivalent to the spool description file in case of the single job and is generated on the basis of a plurality of job setting information in case of the combined job. The job setting file will now be described.

FIG. 10 shows an example of the job setting file which holds the information constructing the printable physical pages which are formed by the spool file manager 304 in step 608. A field 1001 is an ID for identifying the job and can be also held in a form of a name of the file or common memory which holds the information. A field 1002 is job setting information. The job setting information includes the information necessary for allowing the graphic engine 202 to start the printing of the job such that only one information can be set for one job, that is, the information such as structure, designation of the N-up printing, designation of an additional drawing such as a page frame, the number of copies, finishing designation such as staple, and the like. The information of the necessary number is held in the job setting information 1002 in accordance with the function for the job. A field 1003 is the number of physical pages of the job and it indicates that the physical page information of such a number has been stored after this field. In the embodiment, since the method whereby the number of printable physical pages is notified is used, the apparatus can operate even if this field does not exist. After that, the physical page information as many as the number of fields 1003 is stored in the fields in a range from a field 1004 to the last field. The physical page information will be described with reference to FIG. 12.

FIG. 11 shows an example of the job setting information shown in the field 1002 in FIG. 10. A field 1101 is the number of entire physical pages. A field 1102 is the number of entire logical pages. The fields 1101 and 1102 are added to the print data and used in the case where the number of pages or the like is printed as additional information, or the like. When the printing is continuing, both fields are set to tentative values or the spool file manager 304 postpones the forming of the information of the printable physical pages until the printing is finished. A field 1103 is copy number information for designating how many copies of the present print job are printed. A field 1104 is designation for discriminating whether the print job is printed on a copy unit basis or not in the case where the mode for printing a plurality of copies has been set in the field 1103. A field 1105 is finishing information such as staple, punch, Z-folding, or the like, and it is designated in the case where there is a finisher in the printer main body or outside. A field 1106 is additional print information. That is, additional information such as decoration such as a page frame or the like, date, and the like and information such as user name, the number of pages, watermark printing, and the like which are added to the job are stored in the field 1106. As the number of functions increases, the number of fields included in the job setting information also increases. For example, when the duplex printing is possible, a field to hold the designation of the duplex printing is added.

FIG. 12 shows an example of the physical page information shown in the field 1004 in FIG. 10. A first field 1201 is a physical page number and is a value which is used when the printing order is managed or the physical page number is additionally printed. A field 1202 is physical page setting information. If a layout and color/monochromatic can be designated every physical page, the setting of the layout and color/monochromatic is held. A field 1203 is the number of logical pages which are allocated to the present physical page. In case of allocating four logical pages to one physical page, "4" or an ID indicative of the 4-page printing is held. In a field 1204 and subsequent fields, the information of the logical pages as many as the number designated in the field 1203 is held. In dependence on the number of pages printed from the application 201, there is a case where the number of actual page data is smaller than the number of pages designated in the field 1203. In such a case, special data indicative of a space page is held in the logical page information.

FIG. 13 shows an example of the physical page setting information 1202. A field 1301 is a layout order of the logical pages onto the physical page, and designation of the N-up printing and the order (from the upper left in the lateral direction, downward from the upper left, etc.) of arranging the logical pages onto the physical page is held. Depending on the system, it is not limited to the layout order. There is also a case where the logical page information in the field 1204 and subsequent fields is arranged not in the order of the page numbers but in the order according to the layout order, thereby substituting the setting of 1301. A field 1302 is information of obverse/reverse in the duplex print mode and used, for example, when binding margins of the obverse and reverse sides are matched. A field 1303 is designation of a color page or a monochromatic page. If the printer has a monochromatic mode and a color mode, in a document in which the color page and the monochromatic page exist mixedly, the field 1303 is set to a value which is used in the case where the user wants to print the color page in the color mode and print the monochromatic page in the monochromatic mode, or the like. By possessing this information, in the color printer, the process can be changed on a page unit basis as an auto color mode. That is, in case of the color page, the intermediate transfer material (an intermediate transfer drum, an intermediate transfer belt) or the transfer material (a transfer drum, a transfer belt) is rotated the number of times as many as the number of device colors, for example, four times in case of four colors Y, M, C, and K, and in case of the monochromatic page, it is rotated once only with respect to the black color, thereby enabling the transfer control to be performed. A field 1304 is additional print information and used in case of printing the additional information such as the number of pages, date, and the like onto the physical page. Also with respect to the physical page setting information, fields are added in accordance with the functions of the system.

FIG. 14 shows an example of the physical page information shown at 1204. A field 1401 is an ID of the logical page. By using this ID, the intermediate code in the page description file corresponding to the logical page is referred to from the spool file 303. It is sufficient that the intermediate code of the logical page can be accessed by using this ID. A file or a memory pointer can be also used or it is possible that the intermediate code itself constructing the logical page has been stored. A field 1402 is a logical page number and used in case of printing the logical page number as additional information or used for auxiliary information of the logical page ID. Various setting items which can be set on a logical page unit basis are held in the format information of a field 1403. For example, information of various settings such as additional print information like a page frame and the like, enlargement, and the like which are designated on a logical page unit basis is held. If necessary, it is also possible to store attribute information such as color/mono information or the like of the logical page unit for the logical page. On the contrary, the field 1403 is unnecessary in a system such that it is unnecessary to switch the settings on a logical page unit basis or in a system such that the attribute information of the logical page unit is unnecessary.

The job setting file is constructed as mentioned above. The spool description file is also almost similar to that mentioned above and has a print style (simplex, duplex, booklet printing), print layout (N-up printing, poster printing), additional information (addition of a watermark, a date, and a user name), the number of copies, and paper size information as jobs, and it is constructed by the layout order of the logical pages, the obverse/reverse in the duplex print mode, the color mode, and the like every physical page.

Further, FIG. 3 shows an example in which in addition to the expansion system described so far, the setting editor 307 having the job setting changing function has been arranged. In the embodiment, with respect to the setting contents of the job, the single job is included in the spool description file, the combined job is included in the job setting file shown in FIG. 10, and they are independent of the spool file 303 in which the intermediate codes have been stored. Therefore, the setting of the job can be changed by remaking the job setting file. The setting editor 307 remakes the job setting file by itself or in an interlocking manner with the spool file manager 304 or rewrites a part of the job setting file, thereby realizing the setting changing function of the job.

Figure 15:
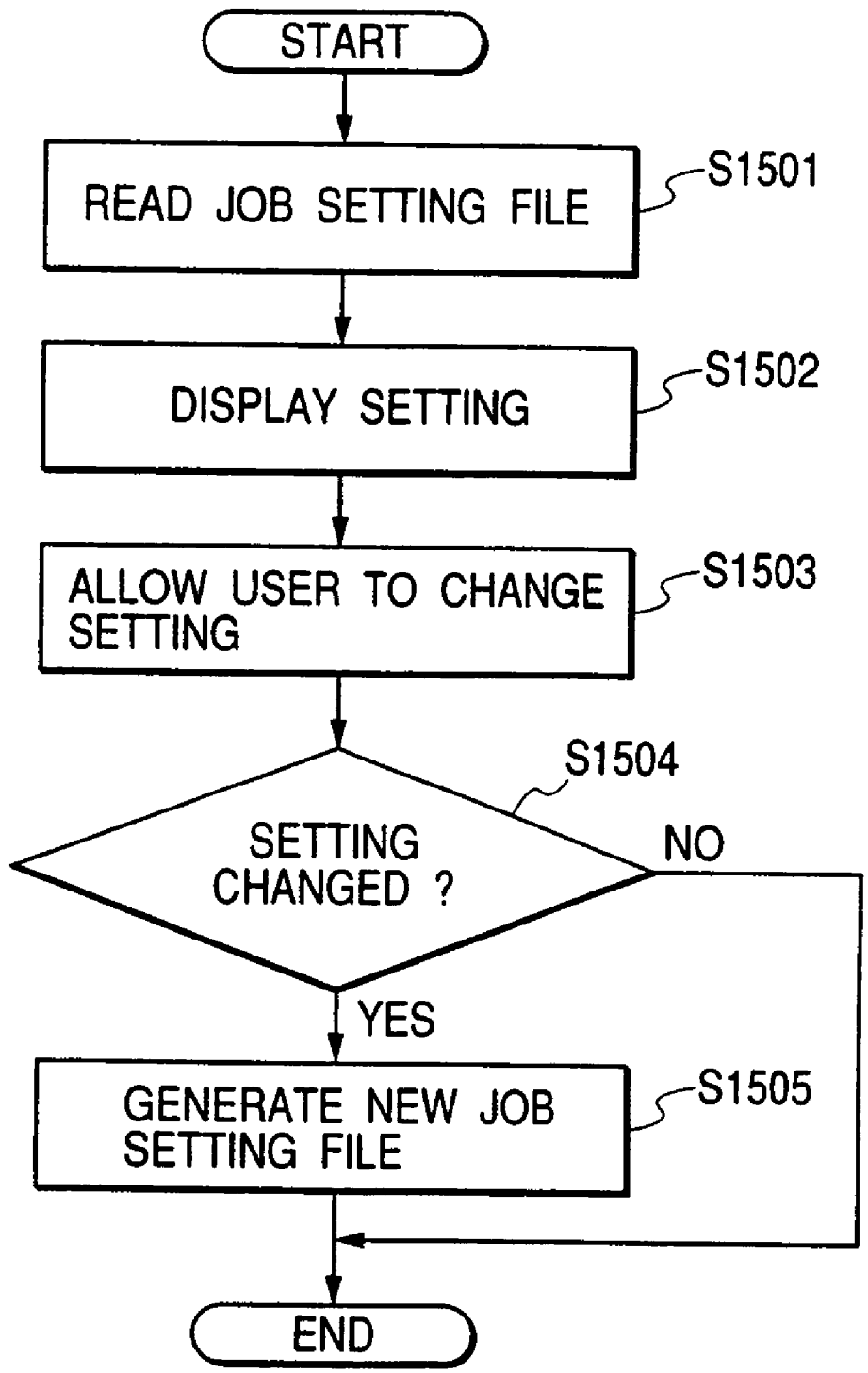
FIG. 15 is a flowchart showing a setting changing process by a setting editor 307.

FIG. 15 is a flowchart showing details of the job setting changing process in the setting editor 307.

First, in step 1501, the setting editor reads the spool description file or the job setting file. The job setting file is the same file as the file which is read by the previewer 306 or despooler 305. Subsequently, step 1502 follows and a read result is displayed to the user. In step 1503, an interactive operation with the user is performed on a user interface as shown in FIG. 18 and the setting contents are changed by the designation of the menu as mentioned above, or the like. This processing step is not limited to the interactive style but can be also executed in a batch style such that the setting is changed in accordance with the contents of the setting change written in the file or the like. Subsequently, the processing routine advances to step 1504 and the setting editor discriminates whether the current designated setting contents have been changed from the contents which were read out first in step 1501 or not. If the setting contents have been changed, step 1505 follows. A new job setting file is formed, the spool file manager is notified of the presence of the change, and the processing routine is finished. If it is decided in step 1505 that there is no change, the spool file manager is notified of the absence of the change and the processing routine is finished. Although the new job setting file is formed as mentioned above, by selecting an "OK" button on the user interface picture plane of FIG. 18, the new job setting file is validated and the old job setting file is deleted. In case of the spool description file of the single job, the old job setting file is held without being deleted instead of obtaining a new job setting file by changing the job setting file.

If a "restore" (to return to the initial state) button is selected on the user interface picture plane of FIG. 18, the new job setting file is deleted and the old job setting file is validated and reflected to the display. Although the embodiment has been described on the assumption that the setting editor 307 is another module, it can be also merely a part of the user interface of the spool file manager 304. It is not always necessary that the setting editor 307 actually writes the change contents into the job setting file, but it is also possible to use a style such that the spool file manager 304 is notified of only the contents of the setting change and the actual change of the job setting file is performed on the spool file manager 304 side.

In FIG. 3, further, the expansion system such that a plurality of print jobs are combined and printed as one print job is shown. An expansion for despooling and previewing the combined job will now be described.

Ordinarily, the spool file 303 in the intermediate form is formed on a job unit basis. In case of the single job, since the intermediate codes of the respective logical pages in the processing target job file are sequentially read out and processed, the logical page ID in the field 1401 can be realized by a relative or absolute offset showing at which position in the file each logical page is located. In case of the combined job, it is necessary to specify the spool file and the page information belonging to the job from the job ID in the field 1401. In the embodiment, a method of specifying the spool file by adding the ID to identify the spool file to the logical page ID is used. In this case, it is sufficient to change the field 1401 as a main change point. This is because if the spool file can be identified, the reading of the page portion can be processed by the same logic as that of the process of the single job. If the spool file has been held in a form of the different file every logical page, the file name of the logical page can be also set as it is to the logical page ID in the field 1401.

Figure 19:
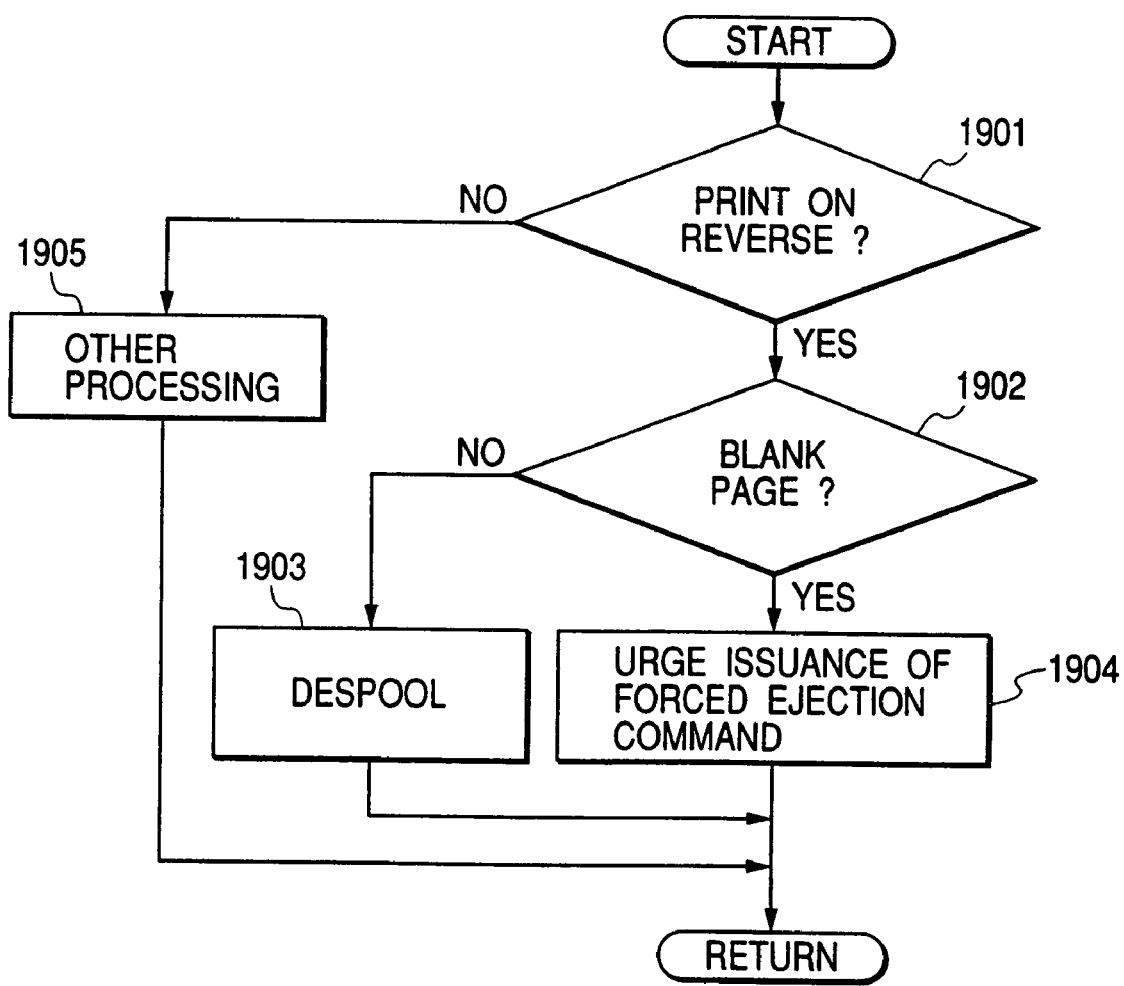
FIG. 19 shows an example of a processing flow for the despooler 305 in the invention.

FIG. 19 is a diagram showing a flowchart for an outline of the characteristic portion of the invention. A processing flow of the invention will be described with reference to the flowchart.

As mentioned above, in the series of printing process, the despooler 305 which received the print command from the spool file manager 304 first discriminates whether the page to be despooled relates to the printing to the reverse side or not by a discriminating process 1901 of discriminating whether the printing is a reverse printing or not. In case of outputting to the obverse, since the process is out of the processing routine of the invention, the processing routine advances to other processing 1905.

Figures 21, 22, 23:
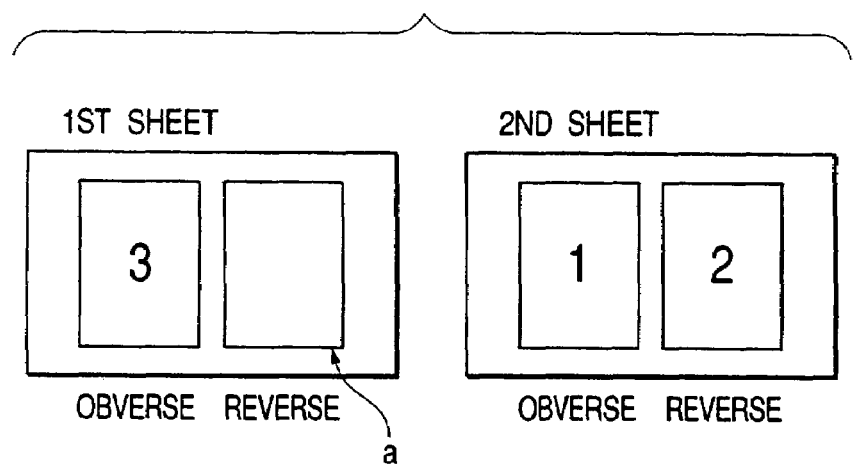
FIG. 21 is a diagram showing an embodiment of the invention.
FIG. 22 shows an example of a command for urging issuance of a forced ejection command of a device of the invention.
FIG. 23 shows an example of obtaining a corresponding situation of the forced ejection command of the device of the invention.

Now, assuming that a page (a) in FIG. 21 is outputted, since the process relates to that for the reverse side, it is determined that a discrimination result indicates the output to the reverse side. A discriminating process 1902 for discriminating whether the page is a page in which a blank page printing is expected or not is executed. As shown in FIG. 21, if the number of entire physical pages is equal to an odd number and the print mode is the duplex print mode and the descending order printing, it is necessary to output the page (a) as a blank page. The spool file manager 304 receives the designation of the duplex printing from the printer driver 203 by using the DEVMODE or the like. Although the explanation is returned, the user interfaces of FIGS. 8, 9, 18, and the like are provided by the printer driver 203 and displayed by a display unit (CRT 110) through the OS. The print setting is inputted in accordance with the operation of the KB 9 or pointing device by the user. The printer driver 203 holds each print setting (including the printing method such as duplex printing, booklet printing, or the like, the page layout such as N-up printing, poster printing, or the like, the paper size information, and the like) inputted through the user interface as print setting information and sends it to the spool file manager 304 as necessary. When the present page is other than the last page or if the number of entire physical pages is equal to an even number, it is determined that the page is not the page in which the blank page is expected. A despooling process 1903 of the next page is executed. It is the despooling process of the ordinary page. Assuming that the page (a) is outputted, it is determined that the page is the page in which the blank page is expected. In next step, an issuing process 1904 of a command to execute a forced paper ejection in the printer as a device to print the print data is executed.

In the conventional technique, in the case where the duplex printing and the descending order printing are designated and the number of entire physical pages is equal to the odd number, the case where the duplex printing, the ascending order printing, and the number of copies (copy unit basis) are designated and the number of entire physical pages is equal to the odd number, or the like, the print data serving as a blank page is printed to the reverse side or a form feed command is issued (a blank page saving cancelling command is also inserted), thereby performing the paper ejection. According to this method, since the image forming process (scan of the laser) is executed as a blank page in the printer, the counter of the print device counts up such a blank page as the number of print processing sheets. When changing by using this count value, the blank page also becomes a charging target. To solve such a problem, the issuing process 1904 of the command for urging the issuance of the forced ejection command of this device is a command serving as a trigger for issuing the forced ejection command which does not become a charging target, that is, in which the image forming process (scan of the laser) is not executed in the printer. The despooler 305 issues a special escape or the like as shown in FIG. 22 to, for example, the printer driver 203 (through the graphic engine 202) (Esc in this diagram is a specific No. to urge issuance of the forced ejection command of the device). In response to this command, the printer driver 203 issues the command for urging the deice to forcedly eject the paper to the device. A form of the forced ejection command is not limited so long as the device ejects the paper without regarding it as a count-up target. For example, if the printing device itself has the command of the forced paper ejection which is not counted up, it is sufficient to use such a command. If the printing device does not have the forced ejection command, a resetting by a virtual paper can be performed, that is, it is also possible to use a method whereby the printer driver 203 inserts a designating command of a paper size different from the paper size designated by the present print job into the print data and the ejection of the paper existing on the duplex path is urged by the printing device, or the like.

In the present LIPS driver (LIPS is a registered trademark of Canon Inc.), as a command adapted to the forced ejection command of the printer, the paper ejection is performed by the following method.

After the special escape is received, the printer driver issues a page format selecting command (LIPS) different from the current paper size (DEVMODE: dmPaperSize) and soon issues the same command for returning it to the original paper size.

Specifically speaking, the printer driver issues the page format selecting command (LIPS) for setting the paper size to "Letter" when the current paper size is equal to A4 and to "A4" when it is other than A4, thereby performing a process to return the paper size to the original size. The paper size is not limited to the A4 and Letter sizes.

For example, in the case where the size is equal to A4 and there are three physical pages, timing for issuing the command by the printer driver is set as follows.

StartDoc( )
StartPage( )
ESC[ 11 p (paper feed command)
ESC[ 14 p (page format selecting command (LIPS) A4 is designated)
(14 indicates the ID of A4 portrait. In case of Letter, 30)
ESC[ 2;1 # x (duplex print control command (LIPS))
(the portion of 1 shows the print mode and the order of front-back)
--- third page data ---
SendPage( )

-continued

Escape(ID:0x2500) The special escape is received from the despooler.
ESC[ 30 p (page format selecting command (LIPS) Letter is designated)
ESC[ 14 p (page format selecting command (LIPS) A4 is designated)
StartPage( )
ESC[ 11 p (paper feed command)
--- first page data ---
SendPage( )
StartPage( )
ESC[ 11 p (paper feed command)
--- second page data ---
SendPage( )
EndDoc( )

By issuing the above-mentioned commands from the printer driver as mentioned above, the device ejects the recording medium without executing the image forming process (scan of the laser) to the blank page, so that the paper ejection is realized without regarding the blank page as a target of the count-up which is executed by the counter.

By the above series of processes, the paper ejecting process of the reverse side is executed without making the blank page as a charging target. Thus, the inconvenience which is caused the user by the charging for the blank page can be solved.

Since the embodiment has been described by using the printer using the method of counting the number of times of the image forming process which is executed by the laser scan, the problem is solved by issuing the command for preventing the image forming process from being executed. However, according to the invention, by taking into consideration a possibility that the blank page becomes the charging target, it is an object to solve such a problem. If the blank page is not counted as a charging target, the object of the invention is finally accomplished. Therefore, an effect similar to that of the present invention can be also obtained even by a count control such that as a number of physical pages, even if the blank page is also counted, it is not counted as a number of pages as charging targets, in other words, the blank page is not logically counted.

Most of the printers start the process from the printing process of the reverse side in the duplex print mode because of a device limitation. In such a printer, if the forced paper ejection is executed in the case where the blank page has to be inserted as a reverse side, there is a case where the printing process of the obverse side cannot be executed. With respect to such a printer, the following control by the printer driver 203 and despooler 305 is executed.

For example, as shown in FIGS. 24A and 24B, in a general printer which starts the process from the printing process of the reverse side in the duplex print mode, a paper ejecting unit for performing the face-down paper ejection (the print surface serving as an obverse faces downward) and a paper ejecting unit for performing the face-up paper ejection (the print surface serving as an obverse faces upward) exist.

In a printer for ejecting the recording medium (recording paper) to the face-down paper ejecting unit, as shown in FIG. 24A, by controlling the page order by the printer driver side (including the despooler 305) as if the recording medium after the ejection were ejected in a face-up state, it seems as if the obverse side were first printed in the printer.

That is, in case of ejecting the recording paper to the face-down paper ejecting unit shown in FIG. 24A, if the print mode is the duplex print mode and the number of physical pages is equal to the odd number, the page order (order outputted from the despooler 305) which is formed by the printer driver 203 is the descending order opposite to the normal ascending order, that is, the order of the eighth (forced ejection command), seventh, sixth, fifth, fourth, third, second, and first pages. In case of starting the duplex printing of "the eighth and seventh pages" as first physical pages, "the seventh page (when the user takes the printed matter, it is the obverse side to him)" corresponding to the reverse side (page face which was fed later) of the page order transmitted from the host computer is first processed. When the printing device processes "the eighth page (when the user takes the printed matter, it is the reverse side to him)" corresponding to the obverse side, since the number of physical pages of this print job is equal to the odd number, the apparatus receives the command (in case of the embodiment, the paper size change command) to urge the forced paper ejection which was inserted by the printer driver 203 and executes the forced paper ejection without performing the printing process of the obverse side (reverse side to him). Thus, this page is not counted up by the counter, that is, the charging process for this page is not executed. After completion of the forced paper ejection, the printing process of the sixth to first pages is executed (the image forming order in the printer is set to the order of the fifth, sixth, third, fourth, first, and second pages), so that the printed matters arranged in the page order (refer to FIG. 24A) similar to that obtained as if by ejecting the paper to the face-down paper ejecting unit in the face-up state are obtained.

In case of ejecting the recording paper to the face-up paper ejecting unit shown in FIG. 24B, if the print mode is the duplex print mode and the number of entire physical pages is equal to the odd number, the page order (order outputted from the despooler 305) which is formed by the printer driver 203 is the order obtained by further exchanging the obverse/reverse sides in the ascending order opposite to the ordinary descending order, that is, the order of the second, first, fourth, third, sixth, fifth, eighth (forced ejection command), and seventh pages. In case of starting the duplex printing of "the second and first pages" as first physical pages, "the first page (when the user takes the printed matter, it is the obverse side to him)" corresponding to the reverse side (page face which was fed later) of the page order transmitted from the host computer is first processed. Subsequently, the printing device processes "the second page (when the user takes the printed matter, it is the reverse side for him)" corresponding to the obverse side, and the printing processes are sequentially executed to the processes of "the sixth and fifth pages". In case of performing the duplex printing of "the eighth and seventh pages" as last physical pages, "the seventh page (when the user takes the printed matter, it is the obverse side to him)" corresponding to the reverse side is first print-processed. After that, when the printing device processes "the eighth page (when the user takes the printed matter, it is the reverse side to him)" corresponding to the obverse side, since the number of physical pages of this print job is equal to the odd number, the apparatus receives the command (in case of the embodiment, the paper size change command) to urge the forced paper ejection which was inserted by the printer driver 203 and executes the forced paper ejection without performing the printing process of the obverse side (reverse side to him). Thus, this page is not counted up by the counter, that is, the charging process for this page is not executed. Consequently, the printed matters arranged in the page order (refer to FIG. 24B) similar to that obtained as if by ejecting the paper to the face-up paper ejecting unit in the face-down state are obtained.

As described above, according to the invention, even in the printer which first print-processes the reverse side, the page order is controlled by the information processing apparatus side (printer driver 203 including the despooler 305) so as to eject the papers in a state where the print surfaces have been reversed and the command to urge the forced paper ejection is transmitted to the printer, thereby making it possible to prevent the blank page data which has been charged for hitherto from becoming the charging target.

There is also a method whereby an adaptivity situation of the device forced ejection command is discriminated and either the mode to issue the forced ejection command of the invention mentioned above or the mode to issue the command to insert the blank page data as in the conventional apparatus is selected.

Figure 20:
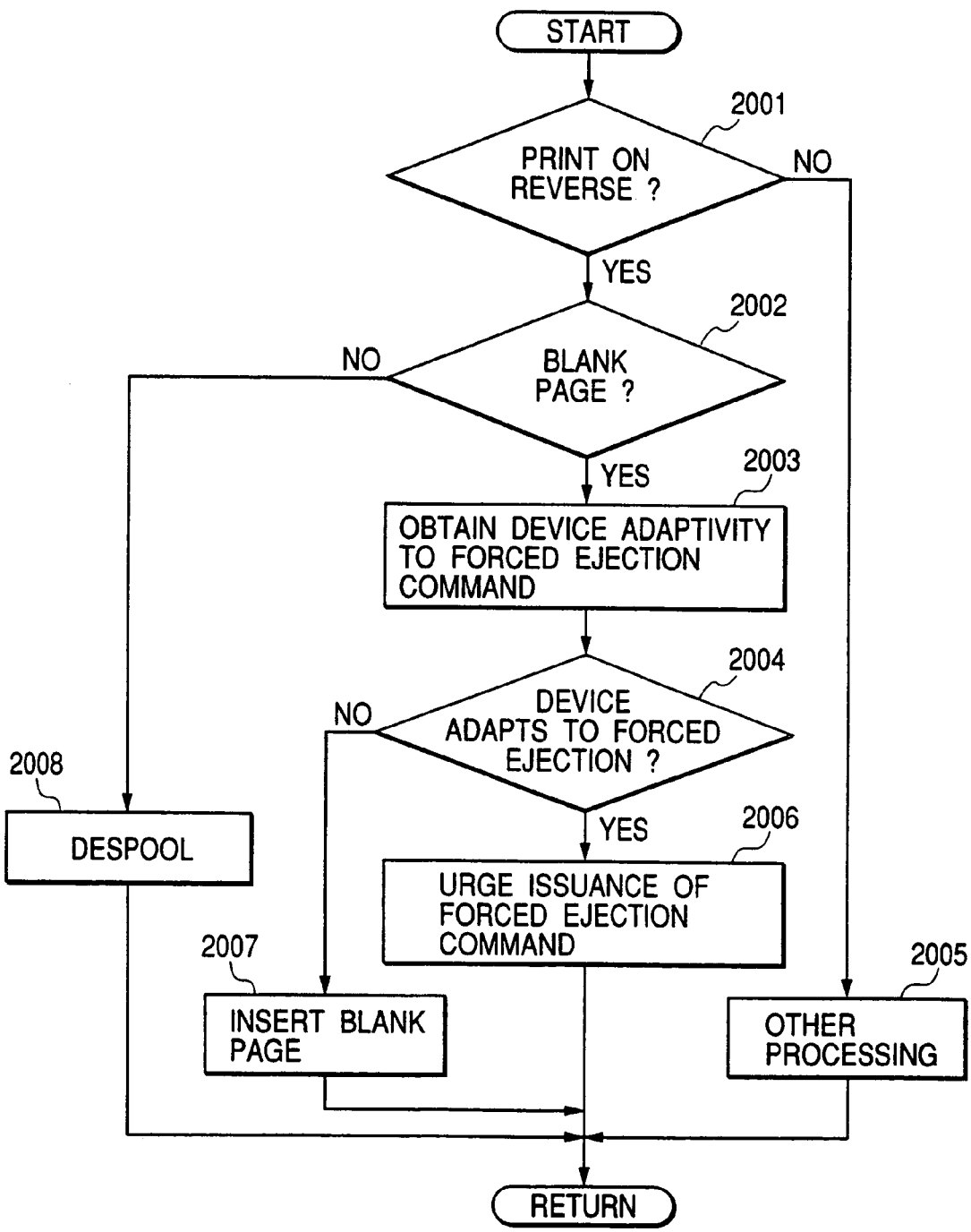
FIG. 20 shows an example of the processing flow of the despooler 305 in the invention.

In a manner similar to the foregoing embodiments, a series of operations will now be described with reference to FIG. 20. In the despooler 305 which received the print command from the spool file manager 304, whether the page to be despooled relates to the printing to the reverse side or not is made by a discriminating process 2001 for discriminating about the reverse printing. In case of outputting onto the obverse side, since the process is out of the present processing routine of the invention, other processing 2005 is executed. Now, presuming a case of outputting the page (a) in FIG. 21, since it relates to the process for the reverse side, it is determined that the print data is outputted to the reverse side. Whether the page is a page in which the blank page printing is expected or not is made by a discriminating process 2002. If the number of entire physical pages is equal to the odd number and the print mode is the descending order printing as shown in FIG. 21, it is necessary to print the page (a) as a blank page. In case of the page other than the last page or if the number of entire physical pages is equal to the even number, it is determined that the page is not the page in which the blank page printing is expected. A despooling process 2008 of the next page is executed. This process is the despooling process of the normal page.

In case of presuming the output of the page (a), it is determined that the page is the page in which the blank page printing is expected. An adaptivity obtaining process 2003 of the forced ejection command of the next device is executed. It is a process for obtaining a discrimination result about whether the device or driver is adapted to the forced ejection command or not. For example, if a command to urge issuance of the forced ejection command which will be issued later is the special escape, a special escape as shown in FIG. 23 can be also similarly used (Esc in FIG. 23 denotes a specific number to urge issuance of the forced ejection command of the device), or a special interface can be also used. Thus, information about whether the forced ejection command can be used or not is obtained.

A discriminating process 2004 for discriminating whether the device supports the forced ejection command or not is executed. It is a process for discriminating the information of the forced ejection command which has already been obtained. If it is now determined that the device is not adapted to the forced ejection command, a next blank page inserting process 2007 is executed. It is a process for ejecting the reverse page by inserting the print data serving as a blank page in a manner similar to the conventional technique. If it is decided that the device is adapted to the forced ejection command, an issuing process 2006 of the command to urge issuance of the forced ejection command of the next device is executed.

According to the issuing process 2006 of the command to urge issuance of the forced ejection command of the next device, a command serving as a trigger of issuing the forced ejection command which does not become the charging target, for example, a special escape or the like is issued to the printer driver. In response to such command, the printer driver issues the command to urge the forced paper ejection to the device. A form of the command to urge the forced paper ejection is not limited in a manner similar to the foregoing embodiment so long as the device ejects the paper without setting it as a target of the count-up. For example, if the printing device itself has the forced ejection command which does not perform the count-up, it is sufficient to use it. If the device does not have such a command, a method whereby a resetting by a virtual paper is performed and the paper ejection is urged or the like can be also used. By the above series of processes, the paper ejecting method that is optimum to the device can be selected.

The invention can be applied to a system comprising a plurality of apparatuses (for example, a host computer, an interface apparatus, a reader, a printer, and the like) or can be also applied to an apparatus (a copying machine, a printer, a facsimile apparatus, or the like) comprising one equipment.

The object of the invention is also accomplished by a method whereby a memory medium in which program codes of software for realizing the functions of the embodiments mentioned above have been stored is supplied to a computer (or a CPU or an MPU) of a system or an apparatus and the computer reads out the program codes stored in the memory medium and executes processes based on the program codes.

In this case, the program codes themselves read out from the memory medium realize the functions of the embodiments mentioned above, and the memory medium in which the program codes have been stored constructs the invention.

As a memory medium to supply the program codes, for example, it is possible to use a floppy disk, a hard disk, an optical disk, a magnetooptic disk, an MO, a CD-ROM, a CD-R, a DVD, a magnetic tape, a non-volatile memory card, an ROM, or the like.

The invention incorporates not only a case where the functions of the embodiments mentioned above are realized by a method whereby a computer executes the read-out program codes but also a case where on the basis of instructions of the program codes, an OS (Operating System) or the like which is operating on the computer executes a part or all of the actual processes and the functions of the embodiments mentioned above are realized by those processes.

Further, the invention incorporates a case where the program codes read out from the memory medium are written into a memory provided for a function expanding board inserted in a computer or a function expanding unit connected to the computer and, thereafter, a CPU or the like provided for the function expanding board or function expanding unit executes a part or all of the actual processes on the basis of instructions of the program codes, and the functions of the embodiments mentioned above are realized by those processes.

As described above, according to the invention, the information processing apparatus for forming the print data to be print-processed by the printer has the command adding means is constructed in a manner such that the number of pages in the case where the data to be printed is arranged on the recording paper is discriminated, the designation of the duplex printing is received, and when it is determined that the number of pages of the recording paper on which the data to be printed has been arranged is equal to the odd number, the command to urge the forced paper ejection in the printer is added lest the blank page of the last page is logically counted in the printer. Therefore, even if the number of pages of the recording paper on which the data to be printed has been arranged is equal to the odd number in case of performing the duplex printing, the last blank page is not counted in the printer. Thus, an effect such that even in case of executing the charging process by using the counter, the charging that is unnecessary for the user is not caused is obtained.

The information processing apparatus further has the user interface providing means for providing the user interface to designate the print setting and receives the designation of the duplex printing in accordance with the print setting which is inputted through the user interface. Therefore, in this case, the user can generally designate the duplex printing without performing any special designation.

Since the command to urge the forced paper ejection which is added by the command adding means is the paper designating command to designate the paper size different from the paper size designated by the printing process at present, even in the printing process for the printing device which does not have the forced ejection command, the forced paper ejection can be falsely performed.

The information processing apparatus further has: the spooling means for converting the print command which is received by the application through the OS into the intermediate data format and temporarily storing it; and the despooling means for issuing the print command to the OS in the data format such that the application extracts again from the data stored in the spooling means. In the case where the duplex printing is designated and the number of pages of the recording paper on which the data to be printed has been arranged is equal to the odd number, the despooling means issues the print command to which the escape command has been added by the command adding means so that the command to urge the forced paper ejection is added. Therefore, even in the case where the print command is spooled and the descending order printing is performed on the host computer side, it is possible to take into consideration the blank page of the last page.

The information processing apparatus further has the print data forming means for forming the print data which is processed by the printer on the basis of the print command which is received through the OS. In the case where the paper is ejected to the face-up paper ejecting unit in the printer which first performs the printing process of the reverse side in the duplex print mode, the duplex printing is designated. When the number of pages of the recording paper on which the data to be printed has been arranged is equal to the odd number in the printer, the print data forming means forms the print data whose page order has been controlled in a manner such that the face-down paper ejection is performed in the face-up paper ejecting unit. Therefore, even for the printer having the face-up paper ejecting unit which first performs the printing process of the reverse side in the duplex print mode, the forced paper ejection control can be performed to the blank page of the last page.

In the printer which first performs the printing process of the reverse side in the duplex print mode, when the paper is ejected to the face-down paper ejecting unit, if the duplex print mode is designated and the number of pages of the recording paper on which the data to be print-processed has been arranged is equal to the odd number in the printer, the print data forming means forms the print data whose page order has been controlled in a manner such that the face-up paper ejection is performed in the face-down paper ejecting unit. Therefore, even for the printer having the face-down paper ejecting unit which first performs the printing process of the reverse side in the duplex print mode, the forced paper ejection control can be also performed to the blank page of the last page.

What is claimed is:

1. An information processing apparatus, as a host computer, for generating print data to be print-processed by a printer using a printer driver, comprising:

designation receiving means for receiving designation of a duplex printing via a user interface of the printer driver;

discriminating means for discriminating the number of pages of a recoding paper in the case where data to be printed has been arranged on the recording paper;

generating means for generating the print data based on the data to be printed using the printer driver; and command adding means for, in the case where the designation of the duplex printing is received by said designation receiving means and it is determined by said discriminating means that the number of pages of said recording paper on which the data to be printed has been arranged is equal to an odd number, adding a predetermined command in the print data such that a blank page of a last page is not logically counted in the printer, wherein the command to urge the forced paper ejection which is added by said command adding means is a paper designating command to designate a paper size different from a paper size designated by the printing process at present.

2. An information processing apparatus, as a host computer, for generating print data to be print-processed by a printer using a printer driver, comprising:

designation receiving means for receiving designation of a duplex printing via a user interface of the printer driver;

discriminating means for discriminating the number of pages of a recoding paper in the case where data to be printed has been arranged on the recording paper;

generating means for generating the print data based on the data to be printed using the printer driver; and command adding means for, in the case where the designation of the duplex printing is received by said designation receiving means and it is determined by said discriminating means that the number of pages of said recording paper on which the data to be printed has been arranged is equal to an odd number, adding a predetermined command in the print data such that a blank page of a last page is not logically counted in the printer;

spooling means for receiving a print command which is output by an application through an OS and temporarily storing it; and despooling means for issuing the print command to the OS again from data stored by said spooling means, wherein in the case where the duplex printing is designated and the number of pages of the recording paper on which the data to be printed has been arranged is equal to the odd number, said despooling means issues a print command to which an escape command has been added so that the command to urge the forced paper ejection is added by said command adding means.

3. An information processing apparatus, as a host computer, for generating print data to be print-processed by a printer using a printer driver, comprising:

designation receiving means for receiving designation of a duplex printing via a user interface of the printer driver;

discriminating means for discriminating the number of pages of a recoding paper in the case where data to be printed has been arranged on the recording paper;

generating means for generating the print data based on the data to be printed using the printer driver; and command adding means for, in the case where the designation of the duplex printing is received by said designation receiving means and it is determined by said discriminating means that the number of pages of said recording paper on which the data to be printed has been arranged is equal to an odd number, adding a predetermined command in the print data such that a blank page of a last page is not logically counted in the printer.

wherein, when the paper is ejected to a face-up paper ejecting unit in said printer which first executes the printing process of a reverse side in the duplex printing, if the duplex printing is designated and the number of pages of said recording paper on which the data to be print-processed in said printer has been arranged is equal to the odd number, said generating means generates the print data whose page order has been controlled so that a face-down paper ejection is executed in said face-up paper ejecting unit.

4. An information processing apparatus, as a host computer, for generating print data to be print-processed by a printer using a printer driver, comprising:

designation receiving means for receiving designation of a duplex printing via a user interface of the printer driver;

discriminating means for discriminating the number of pages of a recoding paper in the case where data to be printed has been arranged on the recording paper;

generating means for generating the print data based on the data to be printed using the printer driver; and command adding means for, in the case where the designation of the duplex printing is received by said designation receiving means and it is determined by said discriminating means that the number of pages of said recording paper on which the data to be printed has been arranged is equal to an odd number, adding a predetermined command in the print data such that a blank page of a last page is not logically counted in the printer, wherein, when the paper is ejected to a face-down paper ejecting unit in said printer which first executes the printing process of a reverse side in the duplex printing, if the duplex printing is designated and the number of pages of said recording paper on which the data to be print-processed in said printer has been arranged is equal to the odd number, said generating means generates the print data whose page order has been controlled so that a face-up paper ejection is executed in said face-down paper ejecting unit.

5. An information processing method for generating print data to be print-processed by a printer using a printer driver, comprising:

a designation receiving step of receiving designation of a duplex printing via a user interface of the printer driver;

a discriminating step of discriminating the number of pages of a recoding paper in the case where data to be printed has been arranged on the recording paper;

a generating step of generating the print data based on the data to be printed using the printer driver; and a command adding step of, in the case where the designation of the duplex printing is received in said designation receiving step and it is determined in said discriminating step that the number of pages of said recording paper on which the data to be printed has been arranged is equal to an odd number, adding a predetermined command in the print data such that a blank page of a last page is not logically counted in the printer, wherein command urge forced paper ejection which is added in said command adding step is a paper designating command to designate a paper size different from a paper size designated by the printing process at present.

6. An information processing method for generating print data to be print-processed by a printer using a printer driver, comprising:

a designation receiving step of receiving designation of a duplex printing via a user interface of the printer driver;

a discriminating step of discriminating the number of pages of a recoding paper in the case where data to be printed has been arranged on the recording paper;

a generating step of generating the print data based on the data to be printed using the printer driver; and a command adding step of in the case where the designation of the duplex printing is received in said designation receiving step and it is determined in said discriminating step that the number of pages of said recording paper on which the data to be printed has been arranged is equal to an odd number, adding a predetermined command in the print data such that a blank page of a last page is not logically counted in the printer;

a spooling step of receiving a print command which is output by an application through an OS and temporarily storing it; and a despooling means of issuing the print command to the OS again from data stored in said spooling step, wherein in the case where the duplex printing is designated and the number of pages of the recording paper on which the data to be printed has been arranged is equal to the odd number, said despooling step issues a print command to which an escape command has been added so that the command to urge the forced paper ejection is added in said command adding step.

7. An information processing method for generating print data to be print-processed by a printer using a printer driver, comprising:

a designation receiving step of receiving designation of a duplex printing via a user interface of the printer driver;

a discriminating step of discriminating the number of pages of a recoding paper in the case where data to be printed has been arranged on the recording paper;

a generating step of generating the print data based on the data to be printed using the printer driver; and a command adding step of, in the case where the designation of the duplex printing is received in said designation receiving step and it is determined in said discriminating step that the number of pages of said recording paper on which the data to be printed has been arranged is equal to an odd number, adding a predetermined command in the print data such that a blank page of a last page is not logically counted in the printer, wherein, when the paper is ejected to a face-up paper ejecting unit in said printer which first executes the printing process of a reverse side in the duplex printing, if the duplex printing is designated and the number of pages of said recording paper on which the data to be print-processed in said printer has been arranged is equal to the odd number, said generating step generates the print data whose page order has been controlled so that a face-down paper ejection is executed in said face-up paper ejecting unit.

8. An information processing method for generating print data to be print-processed by a printer using a printer driver, comprising:

a designation receiving step of receiving designation of a duplex printing via a user interface of the printer driver;

a discriminating step of discriminating the number of pages of a recoding paper in the case where data to be printed has been arranged on the recording paper;

a generating step of generating the print data based on the data to be printed using the printer driver; and a command adding step of, in the case where the designation of the duplex printing is received in said designation receiving step and it is determined in said discriminating step that the number of pages of said recording paper on which the data to be printed has been arranged is equal to an odd number, adding a predetermined command in the print data such that a blank page of a last page is not logically counted in the printer, wherein, when the paper is ejected to a face-down paper ejecting unit in said printer which first executes the printing process of a reverse side in the duplex printing, if the duplex printing is designated and the number of pages of said recording paper on which the data to be print-processed in said printer has been arranged is equal to the odd number, said generating step generates the print data whose page order has been controlled so that a face-up paper ejection is executed in said face-down paper ejecting unit.

9. A computer-readable medium storing a computer program for an information processing method for generating print data to be print-processed by a printer using a printer driver, comprising:

code for receiving designation of a duplex printing via a user interface of the printer driver;

code for discriminating the number of pages of a recoding paper in the case where data to be printed has been arranged on the recording paper;

code for generating the print data based on the data to be printed using the printer driver; and code for, in the case where the designation of the duplex printing is received in said designation receiving step and it is determined in said discriminating step that the number of pages of said recording paper on which the data to be printed has been arranged is equal to an odd number, adding a predetermined command in the print data such that a blank page of a last page is not logically counted in the printer, wherein the command to urge the forced paper ejection which is added in said command adding step is a paper designating command to designate a paper size different from a paper size designated by the printing process at present.

10. A computer-readable medium storing a computer program for an information processing method for generating print data to be print-processed by a printer using a printer driver, comprising:
- code for receiving designation of a duplex printing via a user interface of the printer driver;
- code for discriminating the number of pages of a recoding paper in the case where data to be printed has been arranged on the recording paper;
- code for generating the print data based on the data to be printed using the printer driver; and
- code for, in the case where the designation of the duplex printing is received in said designation receiving step and it is determined in said discriminating step that the number of pages of said recording paper on which the data to be printed has been arranged is equal to an odd number, adding a predetermined command in the print data such that a blank page of a last page is not logically counted in the printer;
- code for receiving a print command which is output by an application through an OS and temporarily storing it; and
- code for issuing the print command to the OS again from data stored in said spooling step,
- wherein in the case where the duplex printing is designated and the number of pages of the recording paper on which the data to be printed has been arranged is equal to the odd number, said despooling step issues a print command to which an escape command has been added so that the command to urge the forced paper ejection is added in said command adding step.

11. A computer-readable medium storing a computer program for an information processing method for generating print data to be print-processed by a printer using a printer driver, comprising:
- code for receiving designation of a duplex printing via a user interface of the printer driver;
- code for discriminating the number of pages of a recoding paper in the case where data to be printed has been arranged on the recording paper;
- code for generating the print data based on the data to be printed using the printer driver; and
- code for, in the case where the designation of the duplex printing is received in said designation receiving step and it is determined in said discriminating step that the number of pages of said recording paper on which the data to be printed has been arranged is equal to an odd number, adding a predetermined command in the print data such that a blank page of a last page is not logically counted in the printer,
- wherein, when the paper is ejected to a face-up paper ejecting unit in said printer which first executes the printing process of a reverse side in the duplex printing, if the duplex printing is designated and the number of pages of said recording paper on which the data to be print-processed in said printer has been arranged is equal to the odd number, said generating step generates the print data whose page order has been controlled so that a face-down paper ejection is executed in said face-up paper ejecting unit.

12. A computer-readable medium storing a computer program for an information processing method for generating print data to be print-processed by a printer using a printer driver, comprising:
- code for receiving designation of a duplex printing via a user interface of the printer driver;
- code for discriminating the number of pages of a recoding paper in the case where data to be printed has been arranged on the recording paper;
- code for generating the print data based on the data to be printed using the printer driver; and
- code for, in the case where the designation of the duplex printing is received in said designation receiving step and it is determined in said discriminating step that the number of pages of said recording paper on which the data to be printed has been arranged is equal to an odd number, adding a predetermined command in the print data such that a blank page of a last page is not logically counted in the printer,
- wherein, when the paper is ejected to a face-down paper ejecting unit in said printer which first executes the printing process of a reverse side in the duplex printing, if the duplex printing is designated and the number of pages of said recording paper on which the data to be print-processed in said printer has been arranged is equal to the odd number, said generating step generates the print data whose page order has been controlled so that a face-up paper ejection is executed in said face-down paper ejecting unit.

* * * * *

UNITED STATES PATENT AND TRADEMARK OFFICE
CERTIFICATE OF CORRECTION

PATENT NO. : 7,259,874 B2
APPLICATION NO. : 11/290577
DATED : August 21, 2007
INVENTOR(S) : Nishikawa et al.

It is certified that error appears in the above-identified patent and that said Letters Patent is hereby corrected as shown below:

COLUMN 1:
Line 53, "paper:" should read -- paper, --.

COLUMN 5:
Line 4, "front" should read -- font --.

COLUMN 11:
Line 34, "by:" should read -- by --.

COLUMN 12:
Line 3, "have:" should read -- have --;
Line 53, "is" should be deleted;
Line 54, "come" should read -- comes --; and
Line 67, "be" should be deleted.

COLUMN 13:
Line 2, "be" should be deleted; and
Line 13, "is come" should read -- comes --.

COLUMN 14:
Line 18, "includes:" should read -- includes --; and
Line 45, "includes:" should read -- includes --.

COLUMN 15:
Line 34, "are" should read -- is --.

COLUMN 17:
Line 16, "is," should read -- is --.

COLUMN 23:
Line 26, "deice" should read -- device --.

COLUMN 26:
Line 9, "for" should be deleted.

UNITED STATES PATENT AND TRADEMARK OFFICE
CERTIFICATE OF CORRECTION

PATENT NO.      : 7,259,874 B2
APPLICATION NO. : 11/290577
DATED           : August 21, 2007
INVENTOR(S)     : Nishikawa et al.

It is certified that error appears in the above-identified patent and that said Letters Patent is hereby corrected as shown below:

COLUMN 28:
Line 28, "has:" should read -- has --.

COLUMN 29:
Line 18, "recoding" should read -- recording --;
Line 30, "printer, wherein" should read -- printer, ¶ (new paragraph) wherein --;
Line 42, "recoding" should read -- recording --; and
Line 45, "and" should be deleted.

COLUMN 30:
Line 8, "recoding" should read -- recording --;
Line 20, "printer." should read -- printer, --; and
Line 39, "recoding" should read -- recording --.

COLUMN 31:
Line 2, "recoding" should read -- recording --;
Line 14, "printer, wherein command urge forced" should read -- printer, ¶ (new paragraph) wherein the command to urge the forced --;
Line 25, "recoding" should read -- recording --;
Line 28, "and" should be deleted;
Line 29, "of" should read -- of, --; and
Line 57, "recoding" should read -- recording --.

COLUMN 32:
Line 20, "recoding" should read -- recording --;
Line 50, "recoding" should read -- recording --; and
Line 63, "printer, wherein" should read -- printer, ¶ (new paragraph) wherein --.

COLUMN 33:
Line 7, "recoding" should read --recording --;
Line 11, "and" should be deleted; and
Line 38, "recoding" should read -- recording --.

UNITED STATES PATENT AND TRADEMARK OFFICE
CERTIFICATE OF CORRECTION

PATENT NO. : 7,259,874 B2
APPLICATION NO. : 11/290577
DATED : August 21, 2007
INVENTOR(S) : Nishikawa et al.

It is certified that error appears in the above-identified patent and that said Letters Patent is hereby corrected as shown below:

COLUMN 34:
Line 21, "recoding" should read -- recording --.

Signed and Sealed this

Sixth Day of May, 2008

JON W. DUDAS
*Director of the United States Patent and Trademark Office*